US008123360B2

(12) United States Patent
Hasegawa

(10) Patent No.: US 8,123,360 B2
(45) Date of Patent: Feb. 28, 2012

(54) MULTI-PROJECTOR COMPOSITE IMAGE DISPLAY SYSTEM

(75) Inventor: Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 903 days.

(21) Appl. No.: 11/774,206

(22) Filed: Jul. 6, 2007

(65) Prior Publication Data

US 2008/0036971 A1 Feb. 14, 2008

(30) Foreign Application Priority Data

Aug. 8, 2006 (JP) ................................. 2006-215389

(51) Int. Cl.
G03B 21/00 (2006.01)
G03B 21/26 (2006.01)
(52) U.S. Cl. ............................... 353/30; 353/31; 353/94
(58) Field of Classification Search .............. 353/30–31, 353/37, 94, 122, 69; 345/1.3, 30, 33, 108; 352/70
See application file for complete search history.

(56) References Cited

U.S. PATENT DOCUMENTS

| 6,222,593 | B1 * | 4/2001 | Higurashi et al. ............ 348/745 |
| 6,411,302 | B1 * | 6/2002 | Chiraz ........................... 345/545 |
| 6,456,339 | B1 * | 9/2002 | Surati et al. ................... 348/745 |
| 6,804,406 | B1 * | 10/2004 | Chen ................................. 382/254 |
| 7,635,188 | B2 * | 12/2009 | Belliveau et al. .............. 353/30 |
| 7,682,028 | B2 * | 3/2010 | Maeda et al. .................... 353/30 |
| 7,686,457 | B2 * | 3/2010 | Kobayashi et al. ............. 353/94 |
| 2002/0015052 | A1 * | 2/2002 | Deering ........................ 345/647 |
| 2002/0120670 | A1 * | 8/2002 | Chou ............................. 709/201 |
| 2003/0067587 | A1 * | 4/2003 | Yamasaki et al. .............. 353/30 |
| 2005/0007561 | A1 * | 1/2005 | Koyama et al. ................ 353/94 |
| 2005/0140568 | A1 * | 6/2005 | Inazumi ........................ 345/1.3 |
| 2005/0179874 | A1 * | 8/2005 | Miyazawa ...................... 353/94 |
| 2008/0143969 | A1 * | 6/2008 | Aufranc et al. ................ 353/30 |
| 2009/0002637 | A1 * | 1/2009 | Harada ........................... 353/30 |

FOREIGN PATENT DOCUMENTS

JP A-2002-207247 7/2002

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

A display device includes: a transmission/reception section that transmits and receives information to/from any other display device connected thereto; a setting input section that enables setting of relative position information about a relative position between the display device and the other display device; and a control device that generates partial image information from original image information, and makes a display section to display thereon a partial image. The control device includes: a related information transmission control section that transmits position-sequence-related information related to the relative position information; a configuration position recognition section that recognizes an absolute position of the partial image in the original image that is supposed to be displayed by the display device; and a partial image information generation section that generates the partial image information by cutting out at least a part of image information from the original image information.

14 Claims, 14 Drawing Sheets

| 1 | 2 | 3 | 4 | 5 | 6 | 7 | 8 | 9 |
|---|---|---|---|---|---|---|---|---|
| LEFT | LEFT | BELOW | BELOW | RIGHT | RIGHT | ABOVE | LEFT | END |

MULTI-PROJECTOR COMPOSITE IMAGE DISPLAY SYSTEM

BACKGROUND

1. Technical Field

The present invention relates to a display device, a multi-display system, and an image information generation method.

2. Related Art

A multi-display system (projection display system) of a previous type includes a plurality of display devices, e.g., projectors, each generate partial image information from any input original image information, and display a partial image based on the partial image information. The display devices then each display its own partial image so that an original image based on the original image information is displayed on a large-sized screen of the multi-display, system with high intensity and resolution. For example, refer to JP-A-2000-207247 (Patent Document 1).

With the technology of patent document 1, when a multi-display system is placed, a cascade connection is established among a computer device (hereinafter, referred to as PC) and all of the projectors. With such a cascade connection, based on a control signal sequentially provided by the PC, the projectors each recognize number data indicating the connection sequence, and volume data indicating how many projectors are connected. The number data and the volume data are stored in a number data memory and a volume data memory, respectively. When a person who is in charge of placement of the multi-display system makes a setting of processing requirements for each of the projectors through a setting screen displayed on a display section of the PC, the processing requirements are accordingly stored in a processing requirements memory of each of the projectors over a cable connecting the PC and the projectors. The processing requirements here are those correlated to the number data and the volume data, about an extraction area of the partial image and a scale ratio.

Using the provided original image information, the projectors then each search its own processing requirements memory for the processing requirements, i.e., the extraction area and the scale ratio, correlated to the number data and the volume data stored in the number data memory and the volume data memory, respectively. Under thus found and recognized processing requirements, the projectors each extract and extend the partial image information from the original image information so that a partial image is displayed.

With the technology of patent document 1, however, at the time of placement of the multi-display system, when a setting is made for projectors, i.e., how many projectors are connected with which connection sequence, there needs to establish a cascade connection among the PC and the projectors. For setting of the processing requirements, there also needs to go through a setting procedure on a setting screen displayed on the display section of the PC for every processor. That is, at the time of placement of the multi-display system, using the PC is a must, and the projectors cannot autonomously recognize information needed for generation of the partial image information. This thus complicates the operation setting, thereby resulting in a difficulty in constructing the multi-display system.

SUMMARY

An advantage of some aspects of the invention is to provide a di-splay device, a multi-display system, an image information generation method, an image information generation program, and a recording medium, all of which allow easy construction of a multi-display system.

According to an aspect of the invention, a display device is used for a multi-display device, which is configured to be able to display a partial image based on partial image information generated from any input original image information, includes a plurality of display devices connected in series, and displays an original image based on the original image information using the partial images displayed by the display devices.

The display devices each include: first and second transmission/reception sections that are both connected to other display devices, and transmit and receive information to/from the other display devices connected thereto; a setting input section that enables setting and input of relative position information about a relative position between the display device and the other display devices connected thereto; and a control device that generates the partial image information from the original image information, and makes a display section to display thereon a partial image based on the partial image information. The control device includes: a connection status detection section that detects a connection status of the first transmission/reception section and a connection status of the second transmission/reception section; an identification information transmission control section that transmits, via either the first or second transmission/reception section, identification information assigned to the display device in accordance with the connection status detected by the connection status detection section; a connection sequence recognition section that recognizes a connection sequence of the display device with the other display devices based on at least either the connection status detected by the connection status detection section or the received identification information; a related information transmission control section that transmits, via at least either the first or second transmission/reception section, position-sequence-related information related to the relative position information set and input to the setting input section and connection sequence information about the connection sequence recognized by the connection sequence recognition section; a configuration position recognition section that recognizes, based on the position-sequence-related information of the display device, and based on any received position-sequence-related information of the other display devices, a placement configuration of partial images that are supposed to be displayed by the other display devices, and an absolute position of the partial image that is supposed to be displayed by the display device; and a partial image information generation section that generates, based on the placement configuration and the absolute position recognized by the configuration position recognition section, the partial image information by cutting out at least a part of image information from the original image information.

The relative position information about the relative position between the display device and any other display devices adjacently connected thereto is exemplified by the following four types.

The first relative position information is about a relative position, e.g., above, below, left, and right, of any of the other display devices connected in series to the display device on the rear side.

The second relative position information is about a relative position, e.g., above, below, left, and right, of any of the other display devices connected in series to the display device on the front side.

The third relative position information is about a relative position, e.g., above, below, left, and right, of the display device connected in series to any of the other display devices on the rear side.

The fourth relative position information is about a relative position, e.g., above, below, left, and right, of the display device connected in series to any of the other display devices on the front side.

In the aspect of the invention, the display device is configured to include the first and second transmission/reception sections, the setting input section, and the control device including the connection status detection section, the identification information transmission control section, the connection sequence recognition section, the relative information transmission control section, the configuration position recognition section, and the partial image information generation section. With such a configuration, partial image information can be generated from original image information as below, for example.

That is, the connection status detection section detects the connection status of the first transmission/reception section, i.e., the status in which other display devices and the first transmission/reception section are connected one another for possible information transmission and reception, and the connection status of the second transmission/reception section, i.e., the status in which other display devices and the second transmission/reception section are connected one another for possible information transmission and reception.

The identification information transmission control section goes through the following processes in accordance with the connection status detected by the connection status detection section.

As an example, when the connection status detection section detects that only either the first or second transmission/reception section is in the connection status, i.e., the remaining transmission/reception section is not in the connection status, the identification information transmission control section makes the transmission/reception section detected as being in the connection status to transmit identification information. The identification information is the one assigned to the display device of its own, indicating that the display device is connected at the end, i.e., at the forefront or at the tail.

As another example, when the connection status detection section detects that both of the first and second transmission/reception sections are in the connection status, the identification information transmission control section makes at least either the first or second transmission/reception section to transmit identification information based on any identification information received from any other display device, indicating that the display device is connected at the n-th position from the end, i.e., from the forefront or the tail. The identification information to be transmitted is the one assigned to the display device of its own, indicating that the display device is connected at the n+1-th position from the end.

The connection sequence recognition section then recognizes the connection sequence of the display device of its own among other display devices connected in series as below. This recognition is made based on the connection status detected by the connection status detection section, or the identification information received from any other display devices.

As an example, when the connection status detection section detects that only either the first or second transmission/reception section is in the connection status, i.e., the remaining transmission/reception section is not in the connection status, the connection sequence recognition section recognizes that the display device of its own is connected "at the first position from the forefront" or "at the first position from the tail" in the connection sequence.

As another example, when the connection status detection section detects that both of the first and second transmission/reception sections are in the connection status, the connection sequence recognition section recognizes that the di-splay device of its own is connected "at the n+1-th position from the forefront" or "at the n+1-th position from the tail". This recognition is made based on identification information received from any other display device, i.e., indicating that the display device is connected at the n-th position from the end, i.e., from the forefront or the tail.

The related information transmission control section transmits position-sequence-related information via at least either the first or second transmission section. This position-sequence-related information is the one related to the relative position information set and input to the setting input section, and the connection sequence information about the connection sequence recognized by the connection sequence recognition section.

Next, the configuration position recognition section recognizes the placement configuration of partial images that are supposed to be displayed by the other display devices, and the absolute position of a partial image that is supposed to be displayed by the display device of its own. This recognition is made based on the position-sequence-related information of the display device of its own, and based on any position-sequence-related information received from the other display devices.

For example, when the relative position information is the above-described first relative position information, the configuration position recognition section can recognize the placement configuration and the absolute position as below.

That is, the configuration position recognition section performs detection of position-sequence-related information from those for all of the display devices, i.e., detect the position-sequence-related information showing the connection sequence, based on the connection sequence information, of "1st position from the forefront" or "1st position from the tail". Based on the relative position information thus found in the detected position-sequence-related information, the configuration position recognition section recognizes the relative position of a partial image that is supposed to be displayed by the display device snowing the connection sequence of "2nd position from the forefront" or "2nd position from the tail". This "2nd position" means the position with respect to the position of the partial image that is supposed to be displayed by the display device showing the connection sequence of "1st position from the forefront" or "1st position from the tail". Similarly, the configuration position recognition section performs detection of position-sequence-related information from those for all of the display devices, i.e., detect the position-sequence-related information showing the connection sequence, based on the connection sequence information, of "2nd position from the forefront" or "2nd position from the tail-". Based on the relative position information thus found in the detected position-sequence-related information, the configuration position recognition section recognizes the relative position of a partial image that is supposed to be displayed by the display device showing the connection sequence of "3rd position from the forefront" and "3rd position from the tail". This "3rd position" means the position with respect to the position of the partial image that is supposed to be displayed by the display device showing the connection sequence of "2nd position from the forefront" or "2nd position from the tail". As such, the configuration position recognition section sequentially goes through such processes, thereby recognizing the placement configuration of partial images that are supposed to be displayed by the other display devices, i.e., the layout of the partial images configuring an original images (length n×width m (n×m)).

On the placement configuration recognizes as such, e.g., (length n×width m), the configuration position recognition section recognizes the absolute position of a partial image that is supposed to be displayed by the display device of its own. This recognition is made based on the connection sequence information in the position-sequence-related information of the display device of its own, which is found from the position-sequence-related information for all of the display devices.

Thereafter, the partial image information generation section reads a parameter of processing requirements correlated to the placement configuration and the absolute position recognized by the configuration position recognition section. This parameter reading is made from a memory storing therein parameters of processing requirements for use to generate partial image information from original image information. The parameters of processing requirements are those correlated to any possible placement configurations and absolute positions in a multi-display system. The parameters of processing requirements include, for example, information about a cut-out area for use to cut out image information of a predetermined area from original image information for generating the partial image information from the original image information, and information about a scale ratio of the cut-out image information. Using the parameter of processing requirements read as such, the partial image information generation section performs processes so that the partial image information is generated. The processes include a process of cutting out, from the original image information, image information of a cut-out area corresponding to the position of a partial image that is supposed to be displayed by the display device of its own, a process of increasing the size of the cut-out image information, i.e., process of changing the size of the image information, or others.

With such a configuration, at the time of placement of a multi-display system, unlike with the previous technologies, a person who is in charge of placement of the multi-display system is no more required to establish a cascade connection among a PC and display devices, and to make a setting of processing requirements through a setting screen displayed on a display section of the PC. This means that, without using a PC, by the person in charge setting and inputting relative position information to the setting input section of each of the display devices, and by he or she connecting the display devices in series, the display devices each autonomously recognize the placement configuration and the absolute position needed for generation of the partial image information. As such, there is no more need for any complicated operation setting so that a multi-display system can be constructed with ease.

With the display devices each recognizing the placement configuration and the absolute position needed for generation of the partial image information as such, wanting to change the placement configuration, e.g., change the placement configuration of "n×m" to "m×n", or change the placement configuration by reducing or increasing the number of display devices, the person in charge can make such a change with ease, e.g., with no more need to use a PC, only by changing the setting status of the relative position information for the setting input section of each of the display devices, or only by changing the in-series connection status of the display devices.

With the display device in the aspect of the invention, the partial images are at least partially overlapped one another, and configure the original image with the resulting overlapped portions. The partial image information generation section preferably generates the partial image information by cutting out, from the original image information, image information of an area including the overlapped portions of the partial images.

The display devices are each exemplified by a projector that extends and projects the partial images.

When an original image is configured by partial images that are not overlapped one another, if the projectors are not disposed appropriately, a clearance is resultantly observed among the partial images, and thus the original image cannot be satisfactorily displayed.

With the display device in the aspect of the invention, partial images are at least partially overlapped one another, and configure an original image with such overlapped portions. The partial image information generation section generates partial image information by cutting out, from the original image information, the image information of an area including such overlapped portions of the partial images. As such, the partial images extended and projected from each of the projectors are at least partially overlapped so that an original image is displayed. This thus favorably prevents clearance formation among the part-al images, thereby enabling to display the original image with a satisfactory level.

In the aspect of the invention, the display device is preferably provided with a brightness adjustment section that adjusts the brightness of the overlapped portions of the partial images.

The brightness adjustment section may be a light shield plate that optically adjusts the brightness of the overlapped portions of the partial images, i.e., adjust the light amount, or an image correction section that applies an image correction process of adjusting the brightness (intensity and color) to the image information corresponding to the overlapped portions in the partial image information, for example.

The issue here is that when the partial images are partially overlapped one another, and when an original image is configured thereby, in the resulting original image, the intensity value of the overlapped portions is higher than that in the remaining area, thereby resulting in a difficulty in displaying the original image with a satisfactory level.

In the aspect of the invention, because the brightness adjustment section can adjust the brightness of the overlapped portions in the partial images, in the resulting original image, the intensity value of the overlapped portions can be of the level equivalent to the remaining area so that the or original image looks good and natural.

With the display device in the aspect of the invention, preferably, the display device includes a reference image display control section that exercises reference image display control over the display section to display a reference partial image being at least, a part of a screen based on the placement configuration and the absolute position recognized by the configuration position recognition section.

In the aspect of the invention, the reference image display control section configuring the control device generates the reference partial image information based on the placement configuration and the absolute position recognized by the configuration position recognition section. For example, the reference image display control section reads the reference original image information of a screen from a memory, and similarly to the processes of the partial image information generation section, from the reference original image information, cuts out the image information of a cut-out area corresponding to the position of a partial image that is supposed to be displayed by the display device of its own. Alternatively, the reference image display control section reads the reference partial image information correlated to the placement configuration and the absolute position recognized by the configuration position recognition section. This information reading is made from a memory, which stores therein the reference partial image information configuring at least a part of the screen. The reference partial image information is the one correlated to any possible placement configuration and absolute position in a multi-display system. The reference image display control section then exercises reference image display control over the display section to display the reference partial image based on the generated reference partial image information or the read reference partial image information. Such reference image display control thus enables the display device to display the reference partial image corresponding to the position of a partial image that is supposed to be displayed by the display device of its own with no more need for a connection to a PC. Accordingly, at the time of placement of a multi-display system, a person in charge can adjust the positions of the display devices while looking at the reference partial image displayed on each of the display devices. That is, the multi-display system can be constructed with more ease.

With the display device in the aspect of the invention, preferably, the reference image display control section exercises the reference image display control when the display device is turned on.

In the aspect of the invention, at the time of placement of a multi-display system, only by a person in charge turning on the display devices, the display devices each accordingly display thereon the reference partial image corresponding to the position of the partial image that is supposed to be displayed thereby. As such, the person in charge can appropriately adjust the positions of the display devices swiftly while looking at the reference partial image displayed on each of the display devices. That is, the multi-display system can be constructed with more ease and speed.

With the display device in the aspect of the invention, preferably, the reference partial image is configured with guidance information for use to adjust the placement position of the display device.

Herein, the guidance information may be information about numbers and characters corresponding to the position of a partial image that is supposed to be displayed by the display device of its own, or information indicating overlapped portions in an original image as a result of the partial images at least partially overlapping one another, e.g., grid lines and color, for example.

In the aspect of the invention, because the reference partial image includes such guidance information, at the time of placement of a multi-display system, a person in charge can appropriately adjust the positions of the display devices with ease and accuracy while checking the guidance information found in each of the reference partial images displayed on the display devices.

According to another aspect of the invention, a multi-display system includes a plurality of display devices that each generate partial image information from any input original image information, and display a partial image based on the partial image information, and display an original image based on the original image information using the partial images displayed on the display devices. In the multi-display system, the display devices are each the display device described above.

In the aspect of the invention, the multi-display system is provided with such display devices so that the same effects and advantages as the above-described display device can be achieved.

According to still another aspect of the invention, an image information generation method is for a display device for use by a multi-display system, which is configured to be able to display a partial image based on partial image information generated from any input original image information, includes a plurality of display devices connected in series, and displays an original image based on the original image information using the partial images displayed by the display devices. The display devices each include: first and second transmission/reception sections that are both connected to other display devices, and transmit and receive information to/from the other display devices connected thereto; a setting input section that enables setting and input of relative position information about a relative position between the display device and the other display devices connected thereto; and a control device that generates the partial image information from the original image information, and makes a display section to display thereon a partial image based on the partial image information. The image information generation method includes: detecting, by the control device, a connection status of the first transmission/reception section and a connection status of the second transmission/reception section; transmitting, by the control device, via either the first or second transmission/reception section, identification information assigned to the display device in accordance with the connection status detected by the detecting; recognizing, by the control device, a connection sequence of the display device with the other display devices based on at least either the connection status detected by the detecting or the received identification information; transmitting, by the control device, via at least either the first or second transmission/ reception section, position-sequence-related information related to the relative position information set and input to the setting input section and connection sequence information about the connection sequence recognized by the recognizing; recognizing, by the control device, based on the position-sequence-related information of the display device, and based on any received position-sequence-related information of the other display devices, a placement configuration of partial images that are supposed to be displayed by the other display devices, and an absolute position of the partial image that is supposed to be displayed by the display device; and generating, by the control device, based on the placement configuration and the absolute position recognized by the recognizing, the partial image information by cutting out at least a part of image information from the original image in formation.

The image information generation method in the aspect of the invention is executed by the display device described above, and thus the effects and advantages similar to the above-described display devices can be derived.

According to still another aspect of the invention, an image information generation program is for a display device for use by a multi-display system, which is configured to be able to display a partial image based on partial image information generated from any input original image information, includes a plurality of display devices connected in series, and displays an original image based on the original image information using the partial images displayed by the display devices. The display devices each include: first and second transmission/reception sections that are both connected to other display devices, and transmit and receive information to/from the other display devices connected thereto; a setting input section that enables setting and input of relative position information about a relative position between the display device and the other display devices connected thereto; and a control device that generates the partial image information from the original image information, and makes a display section to display thereon a partial image based on the partial image information. The image information generation program includes: detecting, by the control device, a connection status of the first transmission/reception section and a connection status of the second transmission/reception section; transmitting, by the control device, via either the first or second transmission/reception section, identification information assigned to the display device in accordance with the connection status detected by the detecting; recognizing, by the control device, a connection sequence of the display device with the other display devices based on at least either the connection status detected by the detecting or the received identification information; transmitting, by the control device, via at least either the first or second transmission/ reception section, position-sequence-related information related to the relative position information set and input to the setting input section and connection sequence information about the connection sequence recognized by the recognizing; recognizing, by the control device, based on the position-sequence-related information of the display device, and based on any received position-sequence-related information of the other display devices, a placement configuration of partial images that are, supposed to be displayed by the other display devices, and an absolute position of the partial image that is supposed to be displayed by the display device; and generating by the control device, based on the placement configuration and the absolute position recognized by the recognizing, the partial image information by cutting out at least a part of image information from the original image information.

With a recording medium in an aspect of the invention, the image information generation program described above is recorded in a computer device to be ready for reading therefrom.

The image information generation program and the recording medium configured as such are used for execution of the image information generation method described above, and thus the effects and advantages similar to the above-described image information generation method can be derived.

Moreover, the above-described image information generation program is recorded on the recording medium so that the program can be handled with ease.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

In the below, a first embodiment of the invention is described by referring to the accompanying drawings.

Entire Configuration of Multi-Display System

Figure 1:
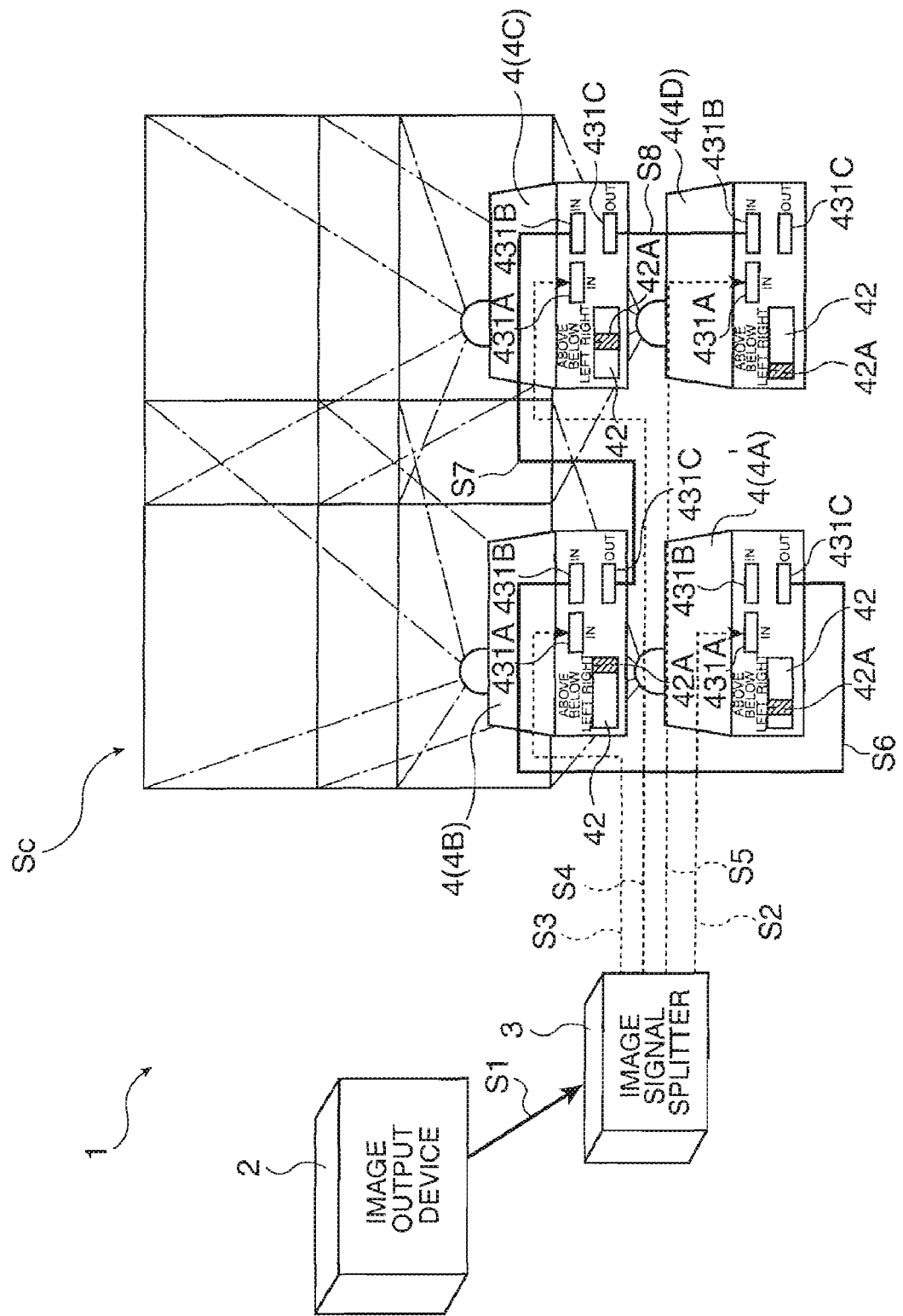
FIG. 1 is a diagram showing the configuration of a multi-display system of a first embodiment of the invention.

FIG. 1 is a diagram showing the configuration of a multi-display system 1.

The multi-display system 1 displays an image, i.e., original image, of high in intensity, high in resolution, and large in size using partial images displayed by a plurality of display devices. As shown in FIG. 1 this multi-display system 1 is configured to include an image output device 2, an image signal splitter 3, and a plurality of projectors 4 each serving as a display device. In this embodiment, four of the projector 4, i.e., 4A, 4B, 4C, and 4D, are provided with two in the longitudinal direction and two in the lateral direction, i.e., 2×2 configuration.

The image output device 2 outputs, utilizing the multi-display systems 1, an image signal being original image information for use to display an image, i.e., original image. For this image output device 2, various types of devices can be used, e.g., personal computer, television tuner, DVD (Digital Versatile Disc) player, or others.

The image signal splitter 3 is connected with the image output device 2 over a signal line S1, and outputs, in parallel, an image signal to each of the projectors 4. The image signal is the one provided by the image output device 2 over the signal line S1. For this image signal splitter 3, for example, used is a general-purpose image signal splitter, which serves to output, in parallel, an image signal provided by the mage output device 2 such as personal computer to each of the projectors 4. This signal output is made via a video buffer amplifier that is for keeping the signal level.

Figure 2:
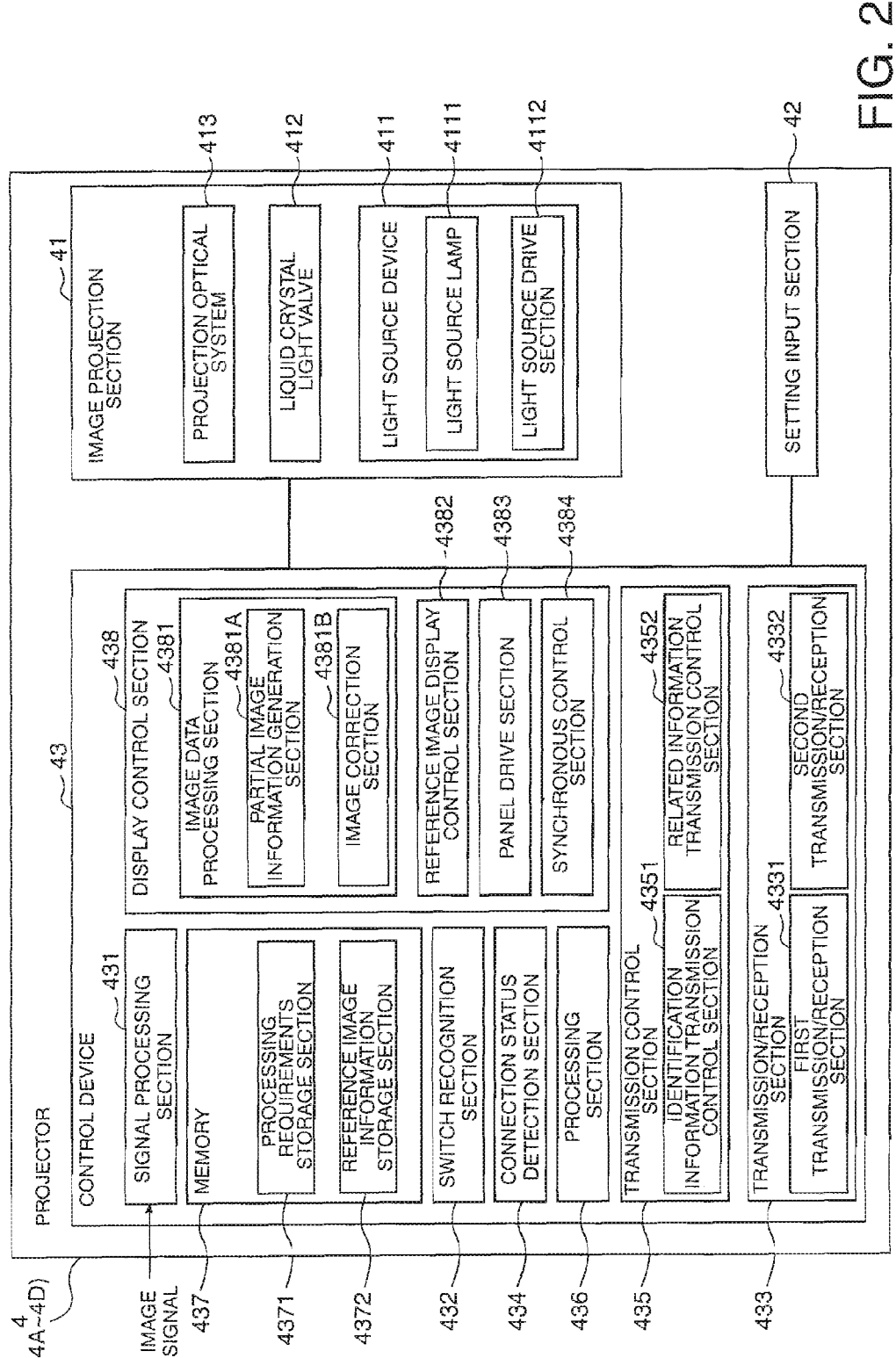
FIG. 2 is a block diagram showing the configuration of a projector of the first embodiment.

FIG. 2 is a block diagram showing the configuration of the projectors 4.

As shown in FIG. 1, the projectors 4 are connected with the image signal splitter 3 over signal lines S2, S3, S4, and S5, respectively. The projectors 4 then each apply predetermined image processing to an image signal provided from the image signal splitter 3 over the signal lines S2 to S5. Based on the image signal through with the image processing as such, the projectors 4 each form an image light by optically processing luminous fluxes coming from a light source, and thus formed image lights are extended and projected on a screen Sc. Although the details are left for later description, as shown in FIG. 1 the projectors 4 are connected in series, i.e., cascaded, by signal lines S6, S7, and S8 for transmission and reception of information not including the image signal. In this example, one of the projectors 4 is assumed as being connected to one or two of the remaining projectors 4 disposed above, below, left, and/or right thereof.

Although not specifically shown, in this embodiment, the screen Sc is of a translucent type through which an incoming image light passes. Alternatively, the screen Sc may be of a reflective type on which an incoming image light is projected after reflected.

In this embodiment, among the four projectors 4A to 4D, as shown in FIG. 1, the projector 4A is so disposed as to take charge of the lower left portion of the screen Sc for extended projection of an image light, i.e., partial image, when viewed from the rear surface side of the screen Sc, i.e., opposite side from the viewer's side. The projector 4B is so disposed as to take charge of the upper left portion of the screen Sc for extended projection of an image light, i.e., partial image, when viewed from the rear surface side of the screen Sc. The projector 4C is so disposed as to take charge of the upper right portion of the screen Sc for extended projection of an image light, i.e., partial image, when viewed from the rear surface side of the screen Sc. The projector 4D is so disposed as to take charge of the lower right portion of the screen Sc for extended projection of an image light, i.e., partial image, when viewed from the rear surface side of the screen Sc.

In this embodiment, as shown in FIG. 1, the image lights, i.e., partial images, being the results of the extended projection from the projectors 4A to 4D are assumed as configuring an original image with partial overlapping.

Also in this embodiment, the four projectors 4A to 4D are assumed as being all configured the same, and in the below, one of the projectors 4 is mainly described. As shown in FIG. 1 or 2, this projector 4 is configured by, mainly, an image projection section 41 (FIG. 2) serving as a display section, a setting input section 4A, and a control device 43 (FIG. 2).

The image projection section 41 forms an image light under the control of the control device 43 for extended projection onto the screen Sc. As shown in FIG. 2, this image projection section 41 is provided with a light source device 411, a liquid crystal light valve 412 being an optical modulator, a projection optical system 413, or others.

The light source device 411 emits luminous fluxes toward the liquid crystal light valve 412 under the control of the control device 43. This light source device 411 is provided with a light source lamp 4111 and a light source drive section 4112.

The light source lamp 4111 is configured by an extra-high-pressure mercury lamp, but the extra-high-pressure mercury lamp is not the only option, and any other light source lamps of discharge emission will do, e.g., metal halide lamp and xenon lamp. Moreover, the light source lamp of discharge emission is not restrictive, and various types of self-emitting devices are also possibilities e.g., light-emitting diode, laser diode, organic EL (Electro luminescence) device, and silicon light-emitting device.

The light source drive section 4112 drives the light source lamp 4111 with a predetermined driving voltage under the control of the control device 43.

The liquid crystal light valve 412 is a liquid crystal panel of a translucent type. Based on a drive signal from the control device 43, the liquid crystal light valve 412 changes the alignment of liquid crystal molecules sealed in a liquid crystal cell (not shown), and passes through or block the luminous fluxes emitted from the light source lamp 4111 so that image lights corresponding to the drive signal are emitted to the projection optical system 413.

The projection optical system 413 extends and projects the image light provided by the liquid crystal light valve 412 toward the screen Sc.

Although not shown, the number of the liquid crystal light valves 412 provided to the projector 4 is three to correspond to three colors of RGB, and the light source device 411 is provided with a color separation optical system that separates a light source light into three colors of lights. The projector optical system 413 is provided with a color combining optical system of combining the image lights of three colors, and generating an image light of a color image. Note here that such optical systems can be configured as those in a general projector varying in type.

The setting input section 42 is a portion for allowing to make a setting, for input, of relative position information about the relative position between the projector 4 of its own and any other protectors 4 cascaded thereto by the signal lines S6 to S8. More specifically, as shown in FIG. 1, the setting input section 42 is configured by a slide switch (mechanical switch) with which the relative position information can be mechanically set. The setting input section 42 is moved to slide in such a manner that a switch top 42A comes to the position of "•", "above", "below", "left", or "right" formed to an external cabinet 44, thereby making a setting of the relative position information about the position of the projector 4 cascaded on the rear side to the projector 4 of its own. Hereinafter, other projectors cascaded first on the rear and front of the projector 4 are each referred to as adjacently-connected projector.

More in detail, as shown in FIG. 1, in the embodiment, among the four projectors 4A to 4D cascaded together, the projector 4A connected at the forefront is required to extend and project a partial image to the lower left portion when viewed from the rear surface side of the screen Sc, and the projector 4B connected at the rear of the projector 4A is required to extend and project a partial image to the upper left portion when viewed from the rear surface side of the screen Sc. That is, when viewed from the placement position of the projector 4A, the projector 4B is required to be disposed above the projector 4A. As shown in FIG. 1, in the projector 4A, the setting input section 42 is moved to slide to place the switch top 42A at the position of "above" formed to the external cabinet 44.

The projector 4B is required to extend and project a partial image to the upper left portion when viewed from the rear surface side of the screen Sc, and the projector 4C connected at the rear of the projector 4B is required to extend and project a partial image to the upper right portion when viewed from the rear surface side of the screen Sc. That is, when viewed from the placement position of the projector 4B, the projector 4C is required to be disposed right to the projector 4B. As shown in FIG. 1 the projector 4B, the setting input section 42 is moved to slide to place the switch top 42A at the position of "right" formed to the external cabinet 44.

The projector 4C is required to extend and project a partial image to the upper right portion when viewed from the rear surface side of the screen Sc, and the projector 4D connected at the rear of the projector 4C required to extend and project a partial image to the lower right portion when viewed from the rear surface side of the screen Sc. That is, when viewed from the placement position of the projector 4C, the projector 4D is required to be disposed below the projector 4C. As shown in FIG. 1, in the projector 4C, the setting input section 42 is moved to slide to place the switch top 47A at the position of "below" formed to the external cabinet 44.

At the rear of the projector 4D, no projector is connected, i.e., the projector 4D is the projector 4 connected at the end of the cascade connection. Accordingly, as shown in FIG. 1, the setting input section 42 is moved to slide to place the switch top 42A to the position of "•" formed to the external cabinet 44.

The control device 43 is configured to include a CPU (Central Processing Unit) or others, and exercises control over the projector 4 in its entirety by following a control program stored in a memory 437 (including image information generation program). The control device 43 is mainly described for the information transmission/reception function with other projectors cascaded to the projector of its own, the processing function for any received information, and processing function for any input image signal, and the remaining functions are not described. As shown in FIG. 2, this control device 43 is configured to include a signal processing section 431, a switch recognition section 432, a transmission/reception section 433, a connection status detection section 434, a transmission control section 435, a processing section 436, the memory 437, a display control section 438, or others. These components 431 to 438 are connected together over a bus that is not shown, and configured to enable transmission of any needed information.

The signal processing section 431 converts the image signal provided by the image signal splitter 3 or others via an image input terminal 431A (FIG. 1) into a signal that can be read by the display control section 438, i.e., digital signal, and outputs the resulting signal.

The switch recognition section 432 is electrically connected with the setting input section 42, and recognizes the relative position information set to the setting input section 42 through detection of the status thereof. The switch recognition section 432 outputs, as appropriate, a signal corresponding to thus recognized relative position information to the transmission control section 435, the processing section 436, or others.

The transmission/reception section 433 is a portion of enabling the projector 4 of its own for information transmission/reception with other adjacently-connected projectors 4 through in-series connection, i.e., cascading, therewith over the signal lines S6 to S8 (FIG. 1). This transmission/reception section 433 is standard compliant corresponding to the signal lines S6 to S8, e.g., USB-compliant when the signal lines S6 to S8 are USB (Universal Serial Bus) cables, and is a signal conversion circuit taking in charge of information transmission and reception. As shown in FIG. 2, this transmission/reception section 433 is configured to include first and second transmission/reception sections 4331 and 4332.

The first transmission/reception section 4331 is a portion of establishing a cascade connection for information transmission/reception with the other projectors 4 via a first signal input/output terminal 431B (FIG. 1). The first transmission/reception section 4331 applies a predetermined input interface process to the information received from the other projectors 4 through the signal line connected to the first signal input/output terminal 431B, and outputs the process result. The first transmission/reception section 4331 also applies, under the control of the transmission control section 435, a predetermined output interface process to the information provided by the transmission control section 435, and forwards the process result to the other projectors 4 via the signal line connected to the first signal input/output terminal 431B.

The second transmission/reception section 4332 is a portion of establishing a cascade connection for information transmission/reception with the other projectors 4 via a second signal input/output terminal 431C (FIG. 1). The second transmission/reception section 4332 applies a predetermined input interface process to the information provided by the other projectors 4 through the signal line connected to the second signal input/output terminal 431C, and outputs the process result. The second transmission/reception section 4332 also applies, under the control of the transmission control section 435, a predetermined output interface process to the information output from the transmission control section 435, and forwards the process result to the other projectors 4 via the signal line connected to the second signal input/output-terminal 431C.

The connection status detection section 434 is a portion of detecting the connection status of the first transmission/reception section 4331, i.e., the status in which the other projectors 4 and the first transmission/reception section 4331 are connected together via the first signal input/output terminal 431B over a signal line, and information transmission/reception is enabled thereby. The connection status detection section 434 is also a portion of detecting the connection status of the second transmission/reception section 433, i.e., the status in which the other projectors 4 and the second transmission/reception section 4332 are connected together via the second signal input/output terminal 431C over ea signal line, and information transmission/reception is enabled thereby.

The process of detecting the connection status by the connection status detection section 434 is exemplified as below.

That is, the connection status detection section 434 is so configured as to transmit a predetermined signal, i.e., connection signal, to the first and second transmission/reception sections 4331 and 4332 as appropriate. The connection status detection section 434 is also so configured as to transmit a predetermined signal, i.e., response signal, to the first and second transmission/reception sections 4331 and 4332 as appropriate. The connection status detection section 434 acquires the response signal via the first transmission/reception section 4331, thereby detecting that the other projectors 4 and the first transmission/reception section 4331 are connected together via the first signal input/output terminal 431B over a signal line, i.e., the first transmission/reception section 4331 is in the connection status. That is, when no response signal is acquired via the first transmission/reception section 4331, the connection status detection section 434 detects that the other projectors 4 and the first transmission/reception section 4331 are not in the connection status via the first signal input/output terminal 431B, i.e., the first transmission/reception section 4331 is not in the connection status. Moreover, the connection status detection section 434 acquires the response signal via the second transmission/reception section 4332, thereby detecting that the other projectors 4 and the second transmission/reception section 4332 are connected together via the second signal input/output terminal 431C over a signal line, i.e., the second transmission/reception section 4332 is in the connection status. That is, when no response signal is acquired via the second transmission/reception section 4332, the connection status detection section 434 detects that the other projectors 4 and the second transmission/reception section 4332 are not in the connection status via the second signal input/output terminal 43C, i.e., the second transmission/reception section 4332 is not in the connection status.

Note that the connection status detection section 434 does not necessarily execute the process of detecting the connection status as such, and may detect the connection status with any other processes.

The transmission control section 435 exercises drive control over the transmission/reception section 433 to make it to transmit any predetermined information to the other projectors 4. As shown in FIG. 2, this transmission control section 435 is configured to include an identification information transmission control section 4351, and a related information transmission control section 4352.

The identification information transmission control section 4351 goes through the following processes in accordance with the connection status detected by the connection status detection section 434.

As an example, when the connection status detection section 434 detects that only either the first or second transmission/reception section 4331 or 4332 is in the connection status, i.e., the remaining transmission/reception section is not in the connection status, the identification information transmission control section 4351 makes the transmission/reception section detected as being in the connection status to transmit identification information, i.e., front identification information (In1) or rear identification information (Out1). This identification information is the one assigned to the projector 4 of its own, indicating that the projector 4 is connected at the end, i.e., at the forefront or at the tail.

As another example, when the connection status detection section 434 detects that both of the first and second transmission/reception sections 4331 and 4332 are in the connection status, the identification information transmission control section 4351 increments the identification information received from any other projectors 4, i.e., when the received identification information is the front identification information "In(m)", the information is incremented to "In(m+1)", and when the received identification information is the rear identification information "Out(m)", the information is incremented to "Out(m+1)". The identification information transmission control section 4351 then makes at least either the first or second transmission/reception section 4331 or 4332 to transmit the identification information being the increment result.

The related information transmission control section 4352 makes at least either the first or second transmission/reception section 4331 or 4332 to transmit the position-sequence-related information. The position-sequence-related information is the one in which the relative position information recognized by the switch recognition section 432 is correlated to the connection sequence information about the connection sequence; i.e., the position in the connection sequence from the forefront of the projectors 4, the projector 4 of its own recognized by the processing section 436.

When either the first or second transmission/reception section 4331 or 4332 receives the position-sequence-related information, the related information transmission control section 4352 makes the remaining transmission/reception section not receiving the position-sequence-related information, i.e., either the first or second transmission/reception section 4331 or 4332, to transmit the position-sequence-related information. That is, with the related information transmission control section 4352 going through the above-described processes, the projectors 4 each receive the position-sequence-related information from all of the other projectors 4, i.e., three projectors 4 in this embodiment.

Based on the connection status detected by the connection status detection section 434, and based on the identification information received by the transmission/reception section 433, i.e., the front identification information or the rear identification information, the processing section 436 recognizes the connection sequence, i.e., the position of the connection sequence from the forefront of the projectors, of the projector 4 of its own among the other projectors 4 cascaded thereto.

The processing section 436 also recognizes the placement configuration of the partial images that are supposed to be displayed by the projectors 4, and the absolute position of the partial image that is supposed to be displayed by the projector 4 of its own. This recognition is made based on the position-sequence-related information of the projector 4 of its own, and the position-sequence-related information received from all of the other projectors 4. The placement configuration means the layout of the partial images configuring an original image, i.e., length n×width m, "n×m". The absolute position means the position of the partial image that is supposed to be displayed by the projector 4 of its own on the layout.

That is, the processing section 436 is corresponding to the connection sequence recognition section and the configuration position recognition section in the aspects of the invention.

The memory 437 stores therein a control program for use to execute various types of processes by the control device 43 any information needed for the processes, and any information being the process results. As shown in FIG. 2, t-his memory 437 is provided with a processing requirements storage section 4371, a reference image information storage section 4372, or others.

The processing requirements storage section 4371 stores therein parameters of processing requirements about the processing requirements needed for the partial image data generation process to be executed by the display control section 438. Herein, the parameter of processing requirements is information about the processing requirements for use to generate partial image data, i.e., partial image information, from an image signal, i.e., original image data being original image information, provided via the signal processing section 431. The processing requirements storage section 4371 then correlates, for storage, the parameters of processing requirements with the placement configurations and the absolute positions possible in the multi-display system, e.g., in the placement configuration of "1×1", the area set to "the 1st position" is correlated to a predetermined parameter of processing requirements, in the placement configuration of "1×2", the area set to "the 1st position" is correlated to a predetermined parameter of processing requirements, in the placement configuration of "1×2", the area set to "the 2nd position" is correlated to a predetermined parameter of processing requirements and the like. For example, the processing requirements storage section 4371 includes a data table for use to segment a plurality of information, and for every placement configuration and for every absolute position, the parameters of processing requirements are stored in accordance with the segments of the data table.

The reference image information storage section 4372 is a portion of storing reference partial image data, i.e., reference partial image information, at the time of placement of the multi-display system 1. The reference partial mage data is about reference partial images for use to adjust the projectors 4A to 4D to come at their predetermined placement positions. The reference partial image data is the partial image data being the result of cutting out any predetermined original image data in accordance with the placement configuration of the projectors in use. Although the details are left for later description, the reference partial image data is configured to include guidance data for use to adjust the placement positions of the projectors 4A to 4D. The reference image information storage section 4372 then correlates, for storage, the reference partial image data with the placement configurations and the absolute positions, e.g., in the placement configuration of "1×1", the area set to "the 1st position" is correlated to any predetermined reference a partial image data, in the placement configuration of "1×2", the area set to "the 1st position" is correlated to any predetermined reference partial image data, in the placement configuration of "1×2", the area set to "the 2nd position" is correlated to any predetermined reference partial image data, and the like. For example, the reference image information storage section 4372 includes a data table for use to segment a plurality of information, and for every placement configuration and for every absolute position, the reference image data is stored in accordance with the segments of the data table.

The display control section 438 is a portion of exercising drive control over the liquid crystal light valves 412. More specifically, the display control section 438 generates partial image data by applying predetermined processing to an image signal, i.e., original image data, provided via the signal processing section 431. The display control section 438 outputs a drive signal corresponding to the partial image data to the liquid crystal light valves 417 so that a partial image, i.e., image light, based on the partial image data is formed to the liquid crystal light valves 412. As shown in FIG. 2, this display control section 438 is configured to include an image data processing section 4381, a reference image display control section 4382, a panel drive section 4383, and a synchronous control section 4384, or others.

The image data processing section 4381 performs various types of image data processing, e.g., a partial image data generation process of generating partial image data from digital original image data provided via the signal processing section 431, and any needed image data correction process such as gamma correction as appropriate. As shown in FIG. 2, this image data processing section 4381 is configured to include a partial image information generation section 4381A, an image correction section 4381B, or others. Although not specifically shown, the image data processing section 4381 includes an image data storage section (not shown) for use as a storage area at the time of the above-described image data processing. This image data storage section is a portion of buffering the received original mage data provided via the signal processing section 431, and may be a frame buffer for storing every original image data of a screen, a line buffer for storing scanning data of a horizontal line, or others.

The partial image information generation section 4381A reads, from the processing requirements storage section 4371, a parameter of processing requirements correlated to the placement configuration and the absolute position recognized by the processing section 436. Using the parameter of processing requirements read as such; the partial image information generation section 4381A performs an image data cut-out process and an image size change process, and generates partial image data, i.e., performs the partial image data generation process. The image data cut-out process is of cutting out image data of a predetermined area from the original image data, and the image size change process is of changing the size of the image data of the predetermined area being the cut-out result.

The image correction section 4381B performs, as required, the image data correction process such as gamma correction using an image correction parameter stored in the memory 437. This image data correction process is applied to the partial image data generated by the partial image information generation section 4381A.

When the projectors 4 are turned on, i.e., activated, the reference image display control section 4382 reads the reference partial image data from the reference image information storage section 4372. The reference partial image data here is the one correlated to the placement configuration and the absolute position recognized by the processing section 436. The reference image display control section 4382 then exercises reference image display control of forming a reference partial image to the liquid crystal light valves 412 based on the reference partial image data read as such.

The panel drive section 4383 generates a drive signal from the partial image data being the generation result of the image data processing section 4381 for use to drive the liquid crystal light valves 412, and forwards the drive signal to the liquid crystal light valves 412 so that a partial image, i.e., image light, is formed thereto. The panel drive section 4383 also generates a drive signal from the reference partial image data being the reading result of the reference image display control section 4382 for use to drive the liquid crystal light valves 412, and forwards the drive signal to the liquid crystal light valves 412 so that a reference partial image, i.e., image light, is formed thereto.

The synchronous control section 4384 exercises synchronous control of implementing the above-described various types of image data processing and display control with reference to a synchronous signal found in the original image data provided via the signal processing section 431. That is, with the synchronous control exercised by the synchronous control section 4384 as such, any possible variation is prevented from occurring to the display timing of the projectors 4 (4A to 4D).

Operation of Multi-Display System

Described next is the operation of the above-described multi-display system 1 by referring to the accompanying drawings.

In the following description about the operation of the multi-display system 1, the operation of the protectors 4 is mainly described, and the operation of the image output device 2 and that of the image signal splitter 3 are not described. In the below, described first is the operation of the projectors 4 at the time of placement of the multi-display system 1, and then the operation of the projectors 4 utilizing the multi-display system 1, i.e., tiling display operation.

Operation of Projectors at the Time of Placement

Figure 3:
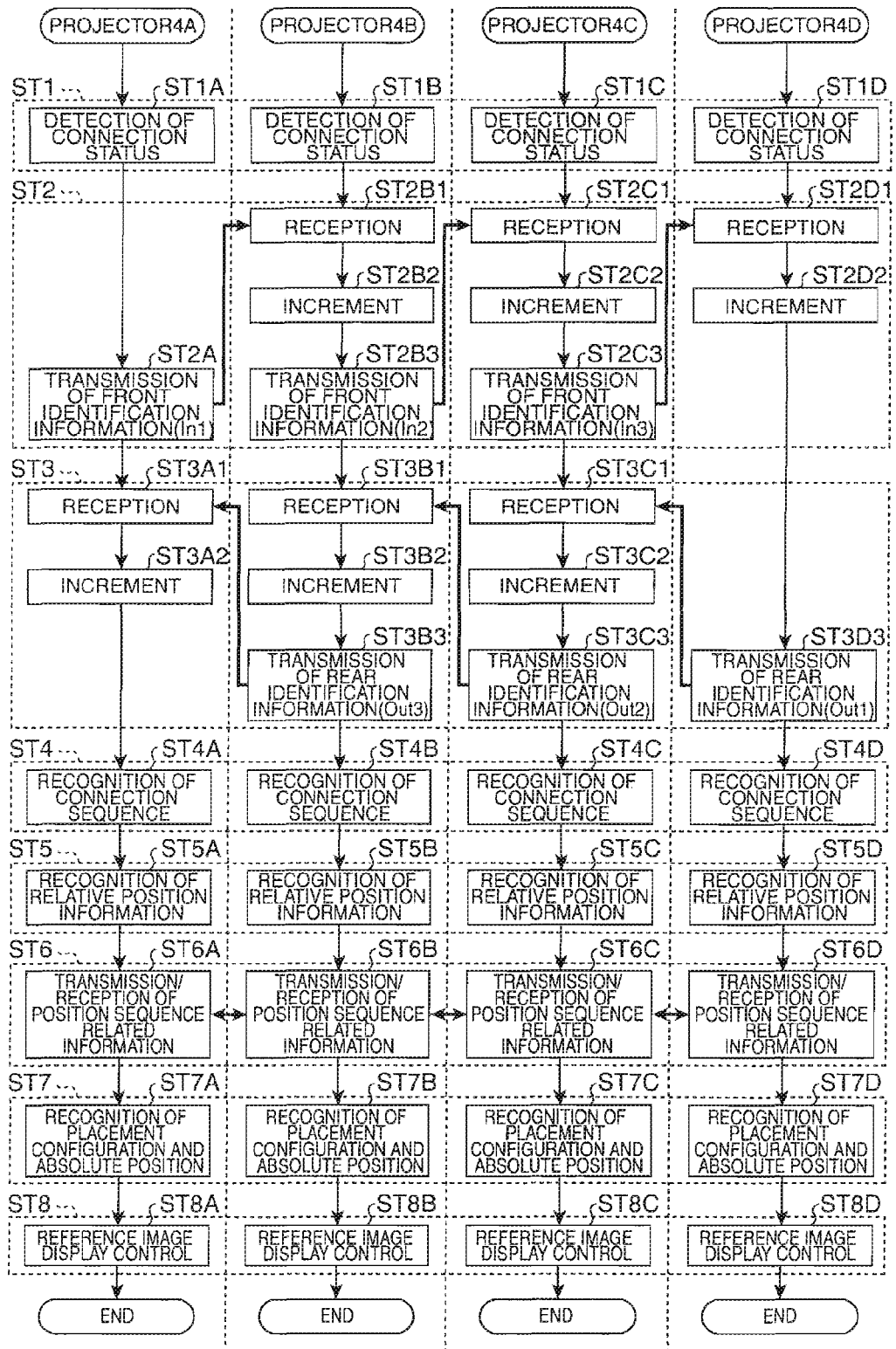
FIG. 3 is a flowchart for illustrating the operation of the projector when the multi-display system of the first embodiment is placed.

FIG. 3 is a flowchart for illustrating the operation of the projectors 4 at the time of placement of the multi-display system 1.

In the following description, the projectors 4A to 4D are assumed as not being connected with the image signal splitter 3 via the signal lines S2 to S5. As shown FIG. 1, the projectors 4A to 4D are assumed as being cascaded by signal lines S6 to S8. As shown in FIG. 1, the setting input section 42 of each of the projectors 4A to 4D is assumed as being set with the relative position information.

First of all, a person in charge of placement operates an operation panel (not shown) provided to each of the projectors 4A to 4D to "turn ON projector" or others. In response thereto, the operation panels each forward a power-ON signal to its corresponding control device 43. Upon reception of the power-ON signal, the control devices 43 each read a control program stored in the memory 437, and go through the following processes by following the control program.

First of all, the connection status detection section 434 of the control device 43 goes through the above-described process of detecting the connection status, i.e.; detects the connection status of the first transmission/reception section 4331 and that of the second transmission/reception section 4332 (step ST1: connection status detection step).

Specifically, as shown in FIG. 1, in the projector 4A, the signal line S6 is connecting the second signal input/output terminal 431C of the projector 4A and the first signal input/output terminal 431B of the projector 4B. The connection status detection section 434 thus detects that the first transmission/reception section 4331 is not in the connection status, and the second transmission/reception section 4332 is in the connection status (step ST1A).

Also as shown in FIG. 1, in the projector 4B, the signal line S6 is connecting the first signal input/output terminal 431B of the projector 4B and the second signal input/output terminal 431C of the projector 4A, and the signal line S7 is connecting the second signal input/output terminal 431C of the projector 4B and the first signal input/output terminal 431B of the projector 4C. The connection status detection section 434 thus detects that both the first and second transmission/reception sections 4331 and 4332 are in the connection status (step ST1B).

Also as shot in FIG. 1 in the projector 4C, the signal line S7 is connecting the first signal input/output terminal 431B of the projector 4C and the second signal input/output terminal 431C of the projector 4B and the signal line S8 is connecting the second signal input/output terminal 431C of the projector 4C and the first signal input/output terminal 431B of the projector 4D. The connection status detection section 434 thus detects that both the first and second transmission/reception sections 4331 and 4332 are in the connection status (step ST1C1).

Also as shown in FIG. 1, in the projector 4D, the signal line S8 is connecting the first signal input/output terminal 431B of the projector 4D and the second signal input/output terminal 431C of the projector 4C. The connection status detection section 434 thus detects that the first transmission/reception section 4331 is in the connection status, and the second transmission reception section 4332 is not in the connection status (step ST1D).

After step ST1, the control device 43 forwards the front identification information assigned to the projector 4 of its own (step ST2: identification information transmission control step).

More specifically, in the projector 4A, in accordance with the connection status detected by the connection status detection section 434, i.e., only the second transmission/reception section 4332 is in the connection status, the identification information transmission control section 4351 makes the second transmission/reception section 4332 to transmit the front identification information (In1). This front identification information is the one assigned to the projector 4 of its own, indicating that the projector 4 is connected at the forefront (step ST2A).

In the projector 4B, after the first transmission/reception section 4331 receives the front identification information (In1) from the projector 4A (step ST2B1), the identification information transmission control section 4351 increments the front identification information (In1) (step ST2B2), and makes the second transmission/reception section 4332 to transmit the front identification information (In2) being the increment result (step ST2B3).

In the projector 4C, after the first transmission/reception section 4331 receives the front identification information (In2) from the projector 4B (step ST2C1), the identification information transmission control section 4351 increments the front identification information (In2) (step ST2C2), and makes the second transmission/reception section 4332 to transmit the front identification information (In3) being the increment result (step ST2C3).

In the projector 4D, after the first transmission/reception section 4331 receives the front identification information (In3) from the projector 4C (step ST2D1), the identification information transmission control section 4351 increments the front identification information (In3) (step ST2D2).

After step ST2, the control device 43 transmits the rear identification information assigned to the projector 4 of its own (step ST3: identification information transmission control step).

Specifically, in the projector 4D, in accordance with the connection status detected by the connection status detection section 434, i.e., only the first transmission/reception section 4331 is in the connection status, the identification information transmission control section 4351 makes the first transmission section 4331 to transmit the rear identification information (Out1). This rear identification information is the one assigned to the projector 4 of its own, indicating that the projector 4 is connected at the tail (step ST3D).

In the projector 4C, after the second transmission/reception section 4332 receives the rear identification information (Out1) from the projector 4D (step ST3C1), the identification information transmission control section 4351 increments the rear identification information (Out1) (step ST3C2), and makes the first transmission/reception section 4331 to transmit the rear identification information (Out2) being the increment result (step ST3C3).

In the projector 4B, after the second transmission/reception section 4332 receives the rear identification information (Out2) from the projector 4C' (step ST3B1) the identification information transmission control section 4351 increments the rear identification information (Out2) (step ST3B2), and makes the first transmission/reception section 4331 to transmit the rear identification information (Out3) being the increment result (step ST3B3).

In the projector 4A, after the second transmission/reception section 4332 receives the rear identification information (Out3) from the projector 4B (step ST3A1), the identification information transmission control section 4351 increments the rear identification information (Out3) (step ST3A2).

After step ST3, the control device 43 recognizes the connection sequence of the projector 4 of its own, i.e., the connection sequence of the projectors 4 indicating the position of the projector 4 of its own from the forefront (step ST4: connection sequence recognition step).

Specifically, in the projector 4A, based on the front identification information (In1) provided in accordance with the connection status detected by the connection status detection section 434, i.e., only the second transmission/reception section 4332 is in the connection status, and based on the rear identification information (Out4) received and incremented by the second transmission/reception section 4332, the processing section 436 recognizes that the number of the cascaded projectors 4 is four, and the connection sequence of the projector 4A is "the 1st position from the forefront of the four projectors" (step ST4A).

In the projector 4B, based on the front identification information (In2) received and incremented by the first transmission/reception section 4331, and based on the rear identification information (Out3) received and incremented by the second transmission/reception section 4332, the processing section 436 recognizes that the number of the cascaded projectors 4 is four, and the connection sequence of the projector 4B is "the 2nd position from the forefront of the four projectors" (step ST4B).

In the projector 4C, based on the front identification information (In3) received and incremented by the first transmission/reception section 4331, and based on the rear identification information (Out2) received and incremented by the second transmission/reception section 4332, the processing section 436 recognizes that the number of the cascaded projectors 4 is four, and the connection sequence of the projector 4C is "the 3rd position from the forefront of the four projectors" (step ST4C).

In the projector 4D, based on the front identification information (In4) received and incremented by the first transmission/reception section 4331, and based on the rear identification information (Out1) provided in accordance with the connection status detected by the connection status detection section 434, i.e., only the first transmission/reception section 4331 is in the connection status, the processing section 436 recognizes that the number of the cascaded projectors 4 is four, and the connection sequence of the projector 4D is "the 4th position from the forefront of the four projectors" (step ST4D).

After step ST4, the control device 43 recognizes the relative position information set to the setting input section 42 (step ST5).

Specifically, in the projector 4A, with the setting as above, the switch recognition section 432' detects the status in which the switch top 42A of the setting input section 42 is positioned at the "above" formed to the external cabinet 44' and recognizes the relative position information about the relative position, i.e., "above" of the projector 4 (4B) cascaded to the projector 4A on the rear side (step ST5A).

In the projector 4B, with the setting as above, the switch recognition section 432 detects the status in which the switch top 42A of the setting input section 42 is positioned at the "right" formed to the external cabinet 44, and recognizes the relative position information about the relative position, i.e., "right" of the projector 4 (4C) cascaded to the projector 4B on the rear side (step ST5B).

In the projector 4C, with the setting as above, the switch recognition section 432 detects the status in which the switch top 42A of the setting input section 42 is positioned at the "below" formed to the external cabinet 44, and recognizes the relative position information about the relative position, i.e., "below" of the projector 4 (4D) cascaded to the projector 4C on the rear side (step ST5C).

In the projector 4D, with the setting as above, the switch recognition section 432 detects the status in which the switch top 42A of the setting input section 42 is positioned at the "•" formed to the external cabinet 44, and recognizes the relative position information about the relative position that there is no other projector 4 cascaded to the projector 4D on the rear side, i.e., the projector 4D is positioned at the tall (step ST5D).

After step ST5, the control device 43 transmits the position-sequence-related information of the projector 4 of its own, and receives the position-sequence-related information of all of the other projectors 4 (step ST6: related information transmission control step).

Specifically, in the projector 4A, the related information transmission control section 4352 makes the second transmission/reception section 4332 to transmit the position-sequence-related information. This position sequence-related-information is the one in which the connection sequence information about the connection sequence, i.e., the 1st position from the forefront of the four projectors, recognized by the processing section 436 is correlated to the relative position information, i.e., above, recognized by the switch recognition section 432. The control device 43 receives, in the second transmission/reception section 4332, the position-sequence-related information of each of the projectors 4B, 4C, and 4D (step ST6A).

In the projector 4B, the related information transmission control section 4352 makes the first and second transmission/reception sections 4331 and 4332 to transmit the position-sequence-related information. This position-sequence-related information is the one in which the connection sequence information about the connection sequence, i.e., in the 2nd position from the forefront of the four projectors, recognized by the processing section 436 is correlated to the relative position information, i.e., right, recognized by the switch recognition section 432. The control device 43 receives, in the first transmission/reception section 4331, the position-sequence-related information of the projector 4A, and receives, in the second transmission/reception section 4332, the position-sequence-related information of the projectors 4C and 4D. The related information transmission control section 4352 makes the second transmission reception section 4332 to transmit the position-sequence-related information of the projector 4A received in the first transmission/reception section 4331. Also, the related information transmission control section 4352 makes the first transmission/reception section 4331 to transmit the position-sequence-related information of the projectors 4C and 4D received in the second transmission/reception section 4332 (step ST6B).

In the projector 4C, the related information transmission control section 4352 makes the first and second transmission/reception sections 4331 and 4332 to transmit the position-sequence-related information. This position-sequence-related information is the one in which the connection sequence information about the connection sequence, i.e., the 3rd position from the forefront of the four projectors, recognized by the processing section 436 is correlated to the relative position information, i.e., below, recognized by the switch recognition section 432. The control device 43 receives, in the first transmission/reception section 4331, the position-sequence-related information of the projectors 4A and 4B, and is provided with, from the second transmission/reception section 4332, the position-sequence-related information of the projector 4D. The related information transmission control section 4352 also makes the second transmission/reception section 4332 to transmit the position-sequence-related information of the projectors 4A and 4B received by the first transmission/reception section 4331. Also, the related information transmission control section 4352 makes the first transmission/reception section 4331 to transmit the position-sequence-related information of the projector 4D received in the second transmission/reception section 4332 (step ST6C).

In the projector 4D, the related information transmission control section 4352 makes the first transmission/reception section 4331 to transmit the position-sequence-related information. This position-sequence-related information is the one in which the connection sequence information about the connection sequence, i.e., the 4th position from the forefront of the four projectors, recognized by the processing section 436 is correlated to the relative position information, i.e., end, recognized by the switch recognition section 432. The control device 43 also receives, in the first transmission/reception section 4331, the position-sequence-related information of the projectors 4A, 4B, and 4C (step ST6D).

After step ST6, based on the position-sequence-related information of the projector 4 of its own, and based on the position-sequence-related information received from all of the other projectors 4, the processing section 436 recognizes the placement configuration of the partial images that are supposed to be displayed by the projectors 4, and the absolute position of the partial image that is supposed to be displayed by the projector 4 of its own (step ST7: configuration position recognize step).

Figures 4A, 4B:
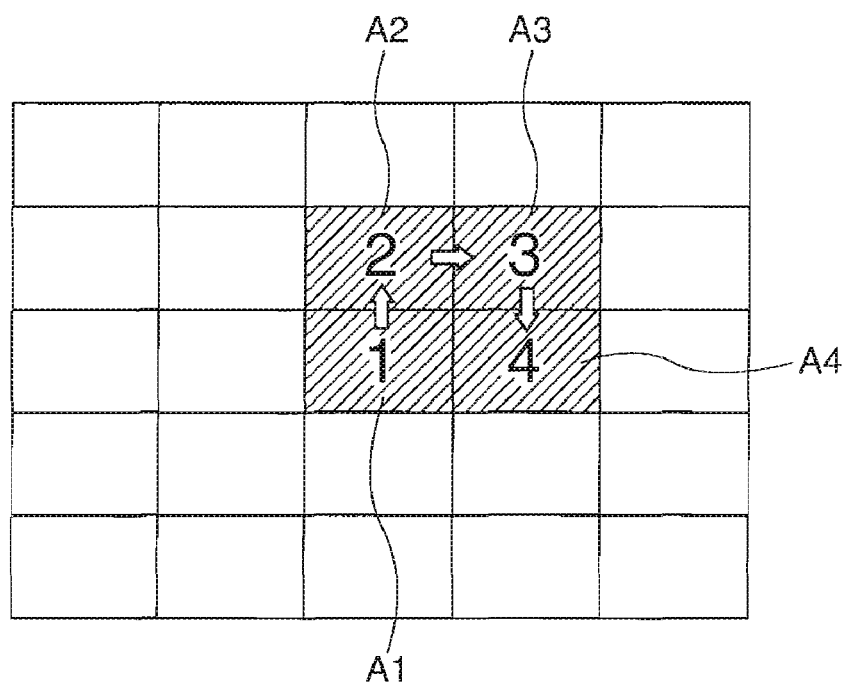
FIGS. 4A and 4B are both a diagram for illustrating a process by a processing section in the first embodiment of recognizing a placement configuration and an absolute position.

FIGS. 4A to 5B are each a diagram for illustrating a process by the processing section 436 of recognizing the placement configuration and the absolute position. Specifically, FIG. 4A is a diagram for illustrating the position-sequence-related information of each of the projectors 4. More specifically, "1" in the upper column and "above" in the lower column denote the position-sequence-related information of the projector 4A, i.e., indicating the connection sequence of "the 1st position from the forefront of the four projectors", and the relative position information of "above". Also, "2" in the upper column and "right" in the lower column denote the position-sequence-related information of the projector 4B, i.e., indicating the connection sequence of "the 2nd position from the forefront of the four projectors", and the relative position information of "right". Also, "3" in the upper column and "below" in the lower column denote the position-sequence-related information of the projector 4C, i.e., indicating the connection sequence of "the 3rd position from the forefront of the four projectors", and the relative position information of "below". Also, "4" in the upper column and "end" in the lower column denote the position-sequence-related information of the projector 4D i.e., indicating the connection sequence of "the 4th position from the forefront of the four projectors", and the relative position information of "end". FIG. 4B shows the two-dimensional area on an internal memory that is not shown.

Figures 5A, 5B:
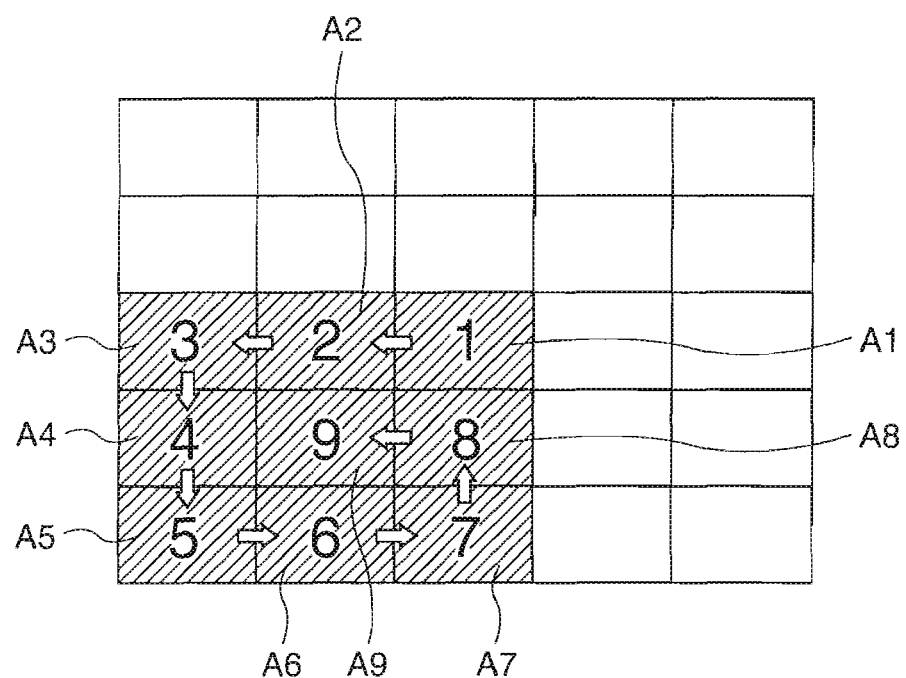
FIGS. 5A and 5B are both also a diagram for illustrating the process by the processing section in the first embodiment of recognizing a placement configuration and an absolute position.

FIGS. 5A and 5B are both showing an exemplary case when the number of the projectors 4 is nine, and are configured similar to FIGS. 4A and 4B.

That is, as shown in FIG. 4B, the processing section 436 sets "the 1st position" to an area A1 occupying the center portion of the two-dimensional area on the internal memory that is not shown. The processing section 436 then detects any of the four position-sequence-related information (FIG. 4A), i.e., the position-sequence-related information in which the connection sequence based on the connection sequence information indicates "the 1st position from the forefront of the four protectors", and recognizes the relative position information, i.e., above, based on the position-sequence-related information. As shown in FIG. 4B, in accordance with the relative position information of "above" recognized as such, the processing section 436 then sets "2nd position" to an area A2 located above the area A1. Next, the processing section 436 detects any of the four position-sequence-related information, i.e., the position-sequence-related information in which the connection sequence based on the connection sequence information is "the 2nd position from the forefront of the four projectors", and recognizes the relative position information, i.e., right, based on the position-sequence-related information. As shown in FIG. 4B, in accordance with the relative position information of "right" recognized as such, the processing section 436 then sets "3rd position" to an area A3 located right to the area A2. Next, The processing section 436 then detects any of the four position-sequence-related information, i.e., the position-sequence-related information in which the connection sequence based on the connection sequence information is "the 3rd position from the forefront of the four projectors", and recognizes the relative position information, i.e., below, based on the position-sequence-related information. As shown in FIG. 4B, in accordance with the relative position information of "below" recognized as such, the processing section 436 then sets "4th position" to an area A4 located below the area A3. Next, the processing section 436 then detects any of the four position-sequence-related information, i.e., the position-sequence-related information in which the connection sequence based on the connection sequence information is "the 4th position from the forefront of the four projectors", and recognizes the relative posit on information, i.e., end, based on the position-sequence-related information. In accordance with the relative position information of "end" recognized as such, the processing section 436 then ends the number setting to the area on the internal memory that is not shown.

With such processes, the processing section 436 recognizes the p-lacement configuration of the areas A1 to A4 set to the two-dimensional area on the memory that is not shown, thereby recognizing that the placement configuration of the partial images that are supposed to be displayed by the protectors 4 is of length 2× width 2, i.e., "2×2".

In the projector 4A, based on the connection sequence information, i.e., the 1st position from the forefront of the four projectors, of the position-sequence-related information for the projector 4A, the processing section 436 recognizes that the absolute position of the partial image that is supposed to be displayed by the projector 4A is the area A1, i.e., the area set to "the 1st position" in the placement configuration of "2×2" (step ST7A).

In the projector 4B, based on the connection sequence information, i.e., the 2nd position from the forefront of the four projectors, of the position-sequence-related information for the projector 4B, the processing section 436 recognizes that the absolute position of the partial image that is supposed to be displayed by the projector 4B is the area A2, i.e., the area set to "the 2nd position" in the placement configuration of "2×2" (step ST7B).

In the projector 4C, based on the connection sequence information, i.e., the 3rd position from the forefront of the four projectors, of the position-sequence-related information for the projector 4C, the processing section 436 recognizes that the absolute position of the partial image that is supposed to be displayed by the projector 4C is the area A3, i.e., the area set to "the 3rd position" in the placement configuration of "2×2" (step ST7C).

In the projector 4D, based on the connection sequence information, i.e., the 4th position from the forefront of the four projectors, of the position-sequence-related information for the projector 4D, the processing section 436 recognizes that the absolute position of the partial image that is supposed to be displayed by the projector 4D is the area A4, i.e., the area set to "the 4th position" in the placement configuration of "2×2" (step ST7D).

As shown in FIGS. 5A and 5B, described above is the process of recognizing the placement configuration and the absolute position in the case with the four projectors 4. Alternatively, if with the nine projectors 4, the processing section 436 recognizes the placement configuration and the absolute position as below.

That is, in the case with the nine projectors 4, with the processes of steps ST1 to ST6, in addition to generating the position-sequence-related information of the projector 4 of its own similarly to the above, the projectors 4 each receive and acquire the position-sequence-related information of the remaining eight projectors 4.

In step ST7, as shown in FIG. 5B, based on the nine position-sequence-related information of FIG. 5A, the processing section 436 sets a number to each of the two-dimensional areas A1 to A9 of an internal memory (not shown) similarly to the above. With such number settings, based on the placement configuration of the areas A1 to A9, the processing section 436 recognizes that the placement configuration of the partial images that are supposed to be displayed by the projectors 4 is "3×3" with length 3× width 3. Similarly, based on the position-sequence-related information of the projector 4 of its own, the processing section 436 recognizes which of the areas A1 to A9 is the absolute position of the partial image that is supposed to be displayed by the projector 4 of its own in the placement configuration of "3×3".

After step ST7, the reference image display control section 4382 exercises reference image display control based on the placement configuration and the absolute position recognized by the processing section 436 (step ST8).

Figure 6:
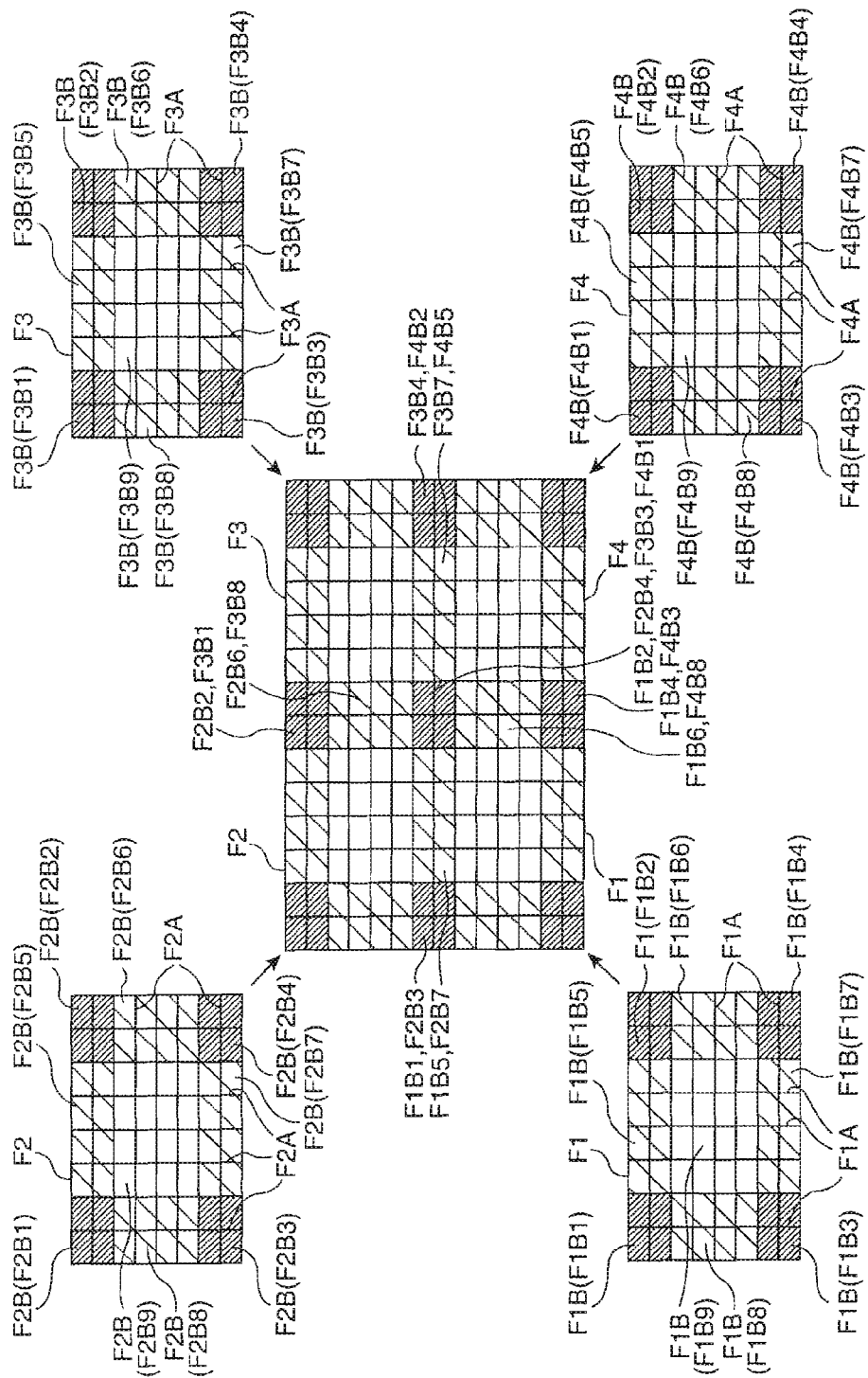
FIG. 6 is a diagram snowing an exemplary reference partial image displayed as a result of reference image display control in the first embodiment.

FIG. 6 is a diagram showing exemplary reference partial images F1 to F4 displayed as a result of the reference image display control. Note here that the exemplary reference partial images F1 to F4 in FIG. 6 are those with tiling display.

Specifically, in the projector 4A, the reference image display control section 4382 reads the reference partial image data from the reference image information storage section 4372, and exercises reference image display control (step ST8A). The reference partial image data here is the one correlated to the placement configuration and the absolute position, i.e., the area A1 set to "the 1st position" in the placement configuration of "2×2" recognized by the processing section 436.

In the projector 4B, the reference image display control section 4382 reads the reference partial image data from the reference image information storage section 4372, and exercises reference image display control (step ST8B). The reference partial image data here is the one correlated to the placement configuration and the absolute position, i.e., the area A2 set to "the 2nd position" in the placement configuration of "2×2" recognized by the processing section 436.

In the projector 4C the reference image display control section 4382 reads the reference partial image data from the reference image information storage section 4372), and exercises reference image display control (step ST8C). The reference partial image data here is the one correlated to the placement configuration and the absolute position, i.e., the area A3 set to "the 3rd position" in the placement configuration. Of "2×2" recognized by the processing section 436.

In the projector 4D, the reference image display control section 4382 reads the reference partial image data from the reference image information storage section 4372, and exercises reference image display control (step ST8D). The reference partial image data here is the one related to the placement configuration and the absolute position, i.e., the area A4 set to "the 4th position" in the placement configuration of "2×2" recognized by the processing section 436.

As shown in FIG. 6, the screen Sc displays thereon the reference partial image F1 being the result of extended projection by the projector 4A, the reference partial image F2 being the result of extended projection by the projector 4B, reference partial image F3 being the result of extended projection by the projector 40, and the reference partial image F4 being the result of extended projection by the projector 4D.

In this embodiment, as shown in FIG. 6, the reference partial images F1 to F4 are assumed as being all the same.

The reference partial images F1 to F4 each include guidance information based on the above-described guidance data. More specifically, the reference partial images F1 to F4 each include information indicating an area where any adjacent reference partial images are overlapped. That is, as shown in FIG. 6, the reference partial images F1 to F4 include, respectively, grid lines F1A, F2A, F3A, and F4A extending in the vertical and lateral directions. In this embodiment as shown in FIG. 6, the lines F1A, F2A, F3A, and F4A each exist seven in the vertical direction, and seven in the lateral direction. Also as shown in FIG. 6, the reference partial image F1 is so configured that the areas segmented by the lines F1A are not in the same color, i.e., the areas corresponding to the overlapped areas are different in color from the remaining areas. This is applicable to the reference partial images F2 to F4. That is, as shown in FIG. 6, among the areas F1B, F2B, F3B, and F4B segmented by the lines F1A, F2A, F3A, and F4A, respectively, areas F1B1 to F1B4, F2B1 to F2B4, F3B1 to F3B4, and F4B1 to F4B4, i.e., four segmented areas each, corresponding to the areas at the four corners are set to black in color. Areas FIBS to F1B8, F2B5 to F2B8, F3B5 to F3B8, F4B5 to F4B8, i.e., eight segmented areas each, along the corner-to-corner sides are set to gray in color, and areas F1B9, F2B9, F3B9, and F4B9 located at the center, i.e., 16 segmented areas each, are set to white in color.

That is, the reference partial image data is configured with the guidance data such as data about the lines F1A, F2A, F3A, and F4A, data about the colors of the areas F1B, F2B, F3B, and F4B, or others.

In the state as such, a person in charge of placement disposes the projectors 4A to 4D while checking the reference partial images F1 to F4, i.e., while checking the lines F1A, F2A, F3A, and F4A, and the areas F1B, F2B, F3B, and F4B.

For example, the projector 4A is disposed at its predetermined position. Next, the projector 4B is so disposed that the areas of the reference partial image F2 extended and projected from the projector 4B, i.e., the areas F2B3, F2B4, and F2B7, match the areas of the reference partial image F1 extended and projected by the projector 4A, i.e., the areas F1B1, F1B2, and F1B5. Next, the projector 4C is so disposed that the areas of the reference partial image F3 extended and projected from the projector 4C, i.e., the areas F3B1, F3B3, and F3B8, match the areas of the reference partial image F2, i.e., the areas F2B2, F2B4, and F2B6, and the area F3B3 of the reference partial image F3 matches the area F1B2 of the reference partial image F1. Lastly, the projector 4D is so disposed that the areas of the reference partial image F4 extended and projected from the projector 4D, i.e., the areas F4B1, F4B3, and F4B8, match the areas of the reference partial image F1, i.e., the areas F1B2, F1B4, and F1B6, and the areas of the reference partial image F4, i.e., reference areas F4B1, F4B2, and F4B5 match the reference partial image F3, i.e., the areas F3B3, F3B4, and F3B7.

Operation of Tiling Display

Figure 7:
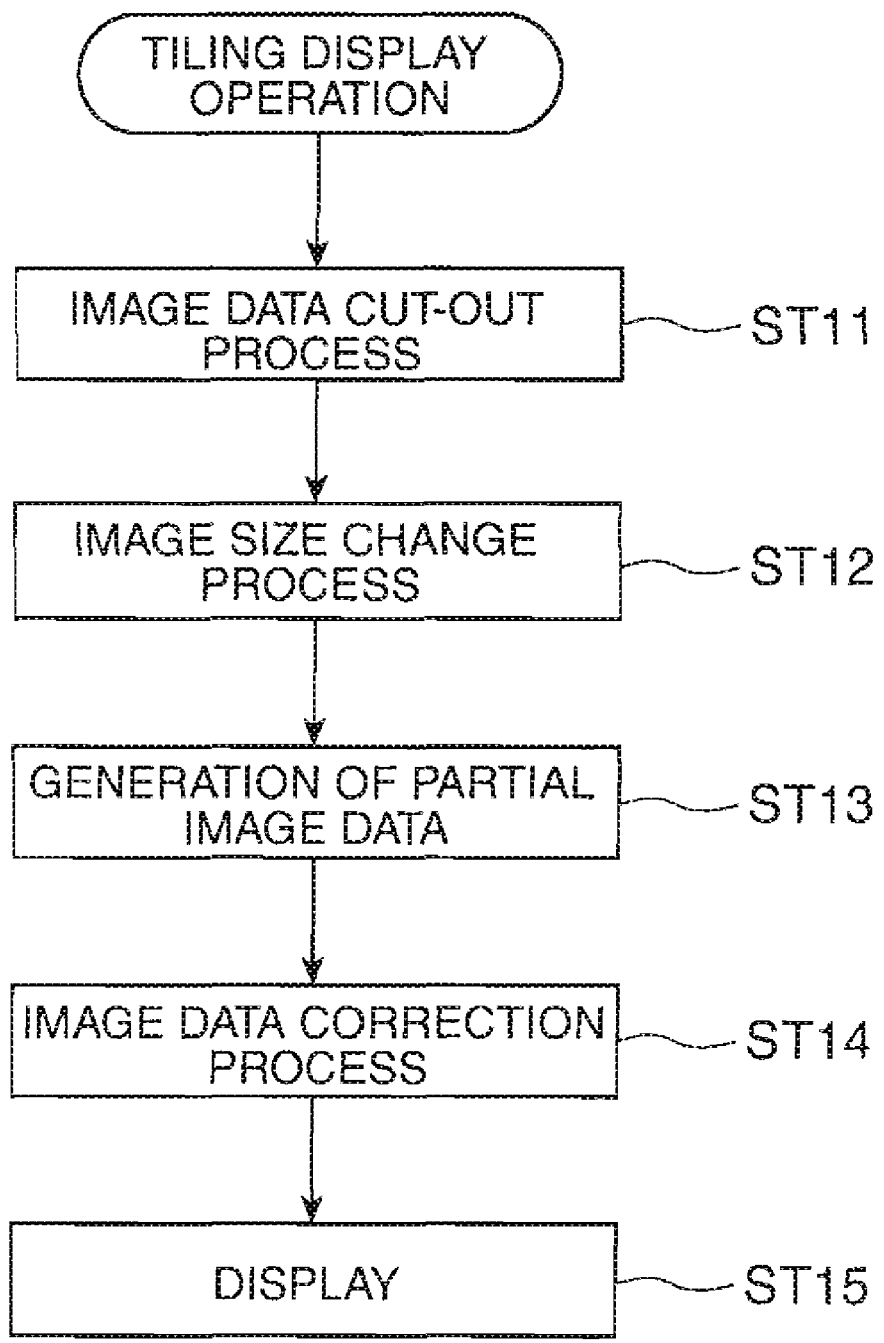
FIG. 7 is a flowchart for illustrating a tiling display operation in the first embodiment.

FIG. 7 is a flowchart for illustrating the operation of tiling display of the projectors 4.

Figure 8:
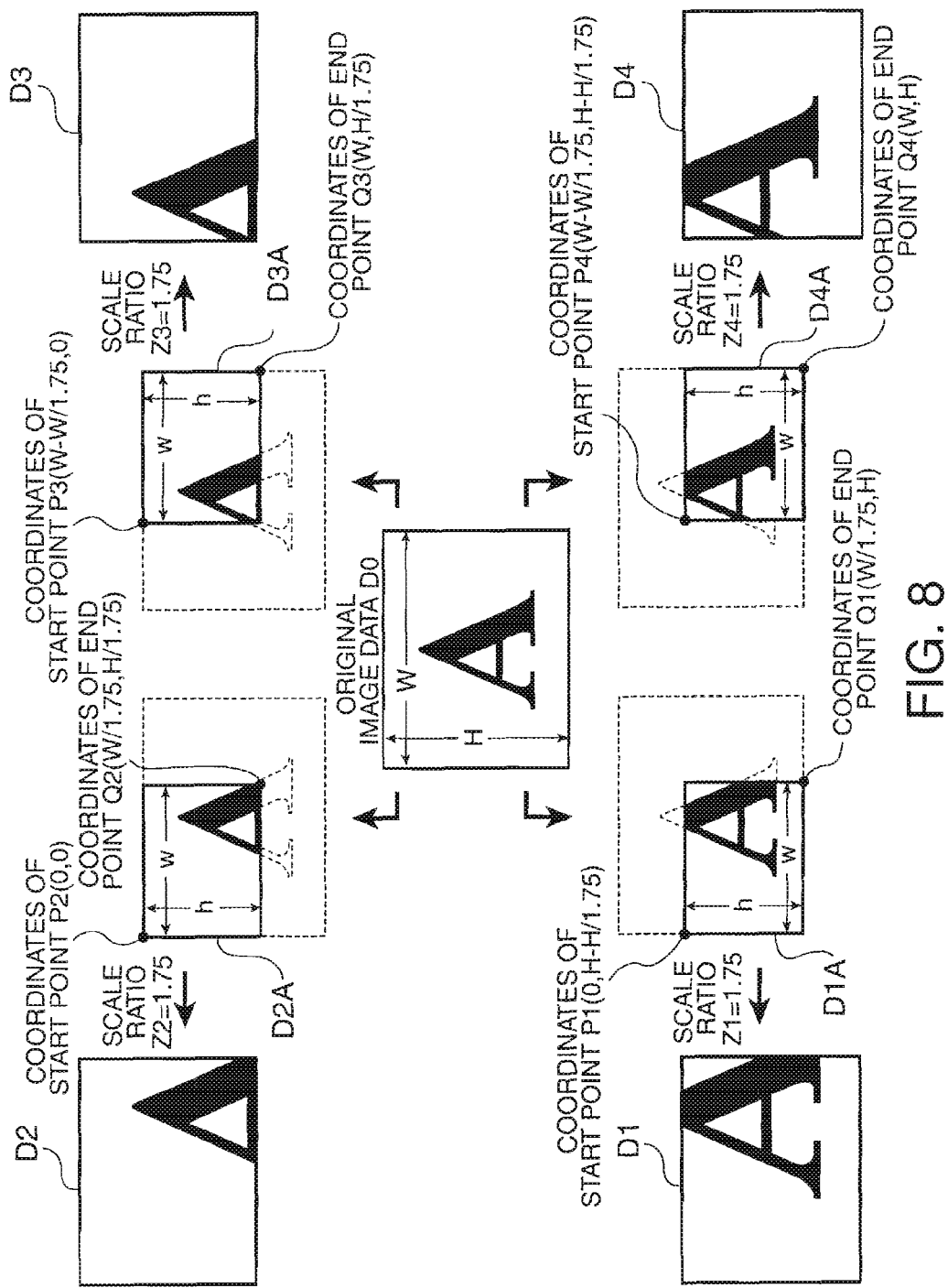
FIG. 8 is another diagram for illustrating the tiling display operation of the first embodiment.

FIG. 8 is a diagram for illustrating the operation of tiling display of the projectors 4.

In the below, the projectors 4A to 4D are assumed as being disposed at the positions described above for the operation of the projectors at the time of placement. Also presumably, the components i.e., the image output device 2, the image signal splitter 3, and the projectors 4A to 4D, are connected through the signal lines S1 to S5 by a person in charge. The setting input sections 42 of the projectors 4A to 4D are in the same setting status as the status described for the operation of the projectors at the time of placement. An image signal coming from the image signal splitter 3 is the same for the projectors 4A to 4D.

First of all, the partial image information generation section 4381A reads a parameter of processing requirements from the processing requirements storage section 4371. The parameter of processing requirements here is the one correlated to the placement configuration and the absolute position recognized by the processing section 436. Using the parameter of processing requirements read as such, the partial image information generation section 4381A then applies processes to the original image data so that the partial image data is generated (step ST13: partial image information generation step). The processes include an image data cut-out process (step ST11), and an image size change process (step ST12).

As shown in FIG. 8, the parameter of processing requirements is exemplified by information including coordinates of a start point and a scale ratio. The start point is of the range of the partial image data in the original image data, and the coordinates of the start point are exemplified by coordinates P (e.g., P1, P2, P3, and P4) for use to specify the cut-out start position, i.e., the upper left portion of the cutting-out rectangular area. The scale ratio is used to determine the scaling of the cut-out image data, and as shown in FIG. 8, a scale ratio Z is expressed by Z=W/w=H/h where W denotes the horizontal resolution of the original image data D0, H denotes the vertical resolution thereof, w denotes the horizontal resolution of the cutting-out rectangular area, and h denotes the vertical resolution thereof. In the embodiment, the scale ratio Z (Z1, Z2, Z3, Z4)=1.75.

More specifically, the partial image information generation section 4381A of the projector 4A goes through steps ST11 to ST13 as below, thereby generating partial image data D1 (FIG. 8).

That is, in step ST11, the partial image information generation section 4381A reads the coordinates of a start point P1 (0, H-H/1.75) and the scale ratio Z1 (FIG. 8) from the processing requirements storage section 4371, and calculates coordinates of an end point Q1(W/1.75, H) based on the reading results, i.e., the coordinates of the start point P1 and the scale ratio Z1. The coordinates of the start point P1 are a parameter of processing requirements correlated to the placement configuration and the absolute position recognized by the processing section 436, i.e., the area A1 set to "the 1st position" in the placement configuration of "2×2". The partial image information generation section 4381A then cuts out image data D1A of the cutting-out range, which is set by the coordinates of the start point P1 read from the original image data D0 and the calculated coordinates of the end point Q1. Thereafter, in step ST12, the partial image information generation section 4381A applies scaling to the cut-out mage data D1A with the scale ratio Z1 so that the partial image data D1 is generated in step ST13.

The partial image information generation section 4381A of the projector 4B goes through steps ST11 to ST13 as below, thereby generating partial image data D2 (FIG. 8).

That is, in step ST11, the partial image information generation section 4381A reads the coordinates of a start point P2 (0, 0) and the scale ratio Z2 (FIG. 8, from the processing requirements storage section 4371, and calculates coordinates of an end point Q2(W/1.75, H/1.75) based on the reading results, i.e., the coordinates of the start point P2 and the scale ratio Z2. The coordinates of the start point P2 are a parameter of processing requirements correlated to the placement configuration and the absolute position recognized by the processing section 436, i.e., the area A2 set to "the 2nd position" in the placement configuration of "2×2". The partial image information generation section 4381A then cuts out image data D2A of the cutting-out range, which is set by the coordinates of the start point P2 read from the original image data D0 and the calculated coordinates of the end point Q2. Thereafter, in step ST12, the partial image information generation section 4381A applies scaling to the cut-out mage data D2A with the scale ratio Z2 so that the partial image data D2 is generated in step ST13.

The partial image information generation section 4381A of the projector 4C goes through steps ST11 to ST13 as below, thereby generating partial image data D3 (FIG. 8).

That is, in step ST11, the partial image information generation section 4381A reads the coordinates of a start point P3 (W-W/1.75, 0) and the scale ratio z3 (FIG. 8) from the processing requirements storage section 4371, and calculates coordinates of an end point Q3(W, H/1.75) based on the reading results, i.e., coordinates of the start point P3 and the scale ratio Z3. The coordinates of the start point P3 are a parameter of processing requirements correlated to the placement configuration and the absolute position recognized by the processing section 436, i.e., the area A3 set to "the 3rd position" in the placement configuration of "2×2". The partial image information generation section 4381A then cuts out image data D3A of the cutting-out range, which is set by the coordinates of the start point P3 read from the original image data D0 and the calculated coordinates of the end point Q3. Thereafter, in step ST12, the partial image information generation section 4381A applies scaling to the cut-out image data D3A with the scale ratio Z3 so that the partial image data D3 is generated in step ST13.

The partial image information generation section 4381A of the projector 4D goes through steps ST11 to ST13 as below, thereby generating partial image data D4 (FIG. 8).

That is, in step ST11, the partial image information generation section 4381A reads the coordinates of a start point P4 (W-W/1.75, H-H/1.75) and the scale ratio Z4 (FIG. 8) from the processing requirements storage section 4371, and calculates coordinates of an end point Q4(W, H) based on the reading results, i.e., the coordinates of the start point P4 and the scale ratio Z4. The coordinates of the start point P4 are a parameter of processing requirements correlated to the placement configuration and the absolute position recognized by the processing section 436, i.e., the area A4 set to "the 4th position" in the placement configuration of "2×2". The partial image information generation section 4381A then cuts out image data D4A of the cutting-out range, which is set by the coordinates of the start point P4 read from the original image data D0 and the calculated coordinates of the end point Q4. Thereafter in step ST12, the partial image information generation section 4381A applies scaling to the cutout image data D4A with the scale ratio Z4 so that the partial image data D4 is generated in step ST13.

After step ST13, the image correction section 4381B applies an image data correction process to the generated partial image data (step ST14).

After step ST14, the panel drive section 4383 generates a drive signal in accordance with the partial image data through with the image data correction process. The resulting drive signal is forwarded to the liquid crystal light valves 412 so that the liquid crystal light valves 412 are formed with partial images corresponding to the partial image data D1 to D4, respectively. Thereafter, the projectors 4A to 4D extend and project the partial images for projection onto the screen Sc so that an original image corresponding to the original image data D0 is displayed (step ST15).

According to the first embodiment described as such, the following effects and advantages are derived as below.

Figure 9A:
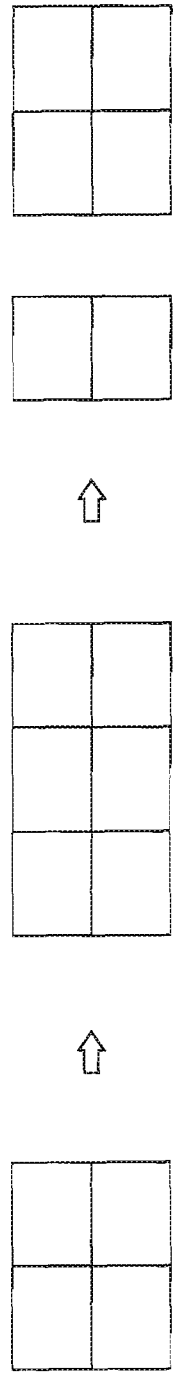
FIGS. 9A and 9B are both a diagram for illustrating the effects and advantages in the first embodiment.
Figure 9B:
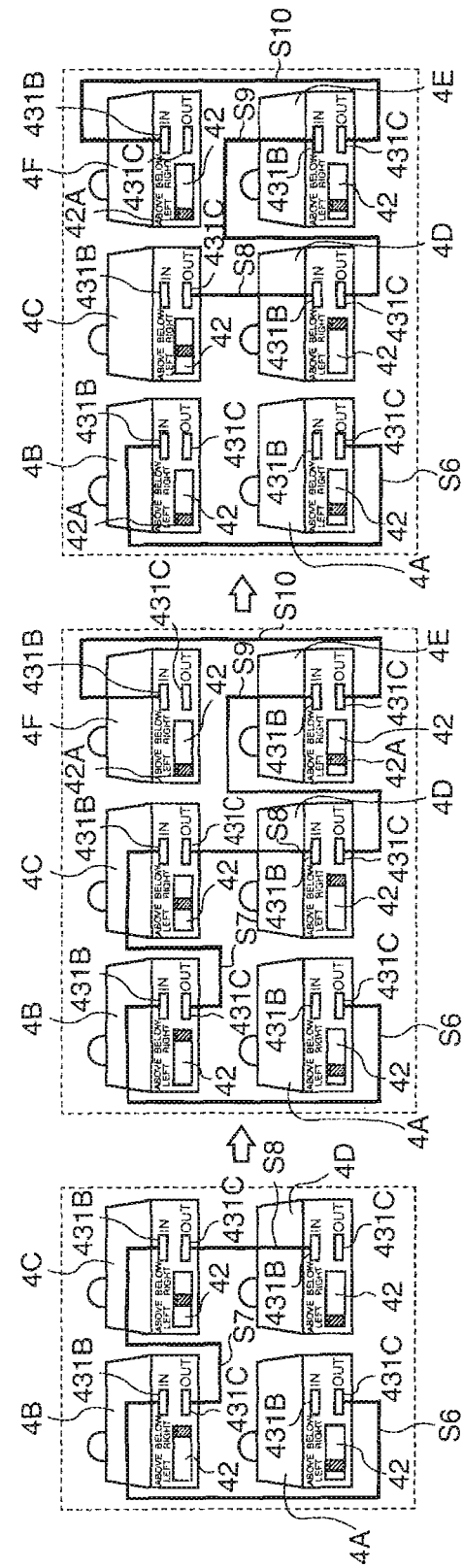

FIGS. 9A and 9B are both a diagram or illustrating the effects and advantages of the first embodiment. To be specific, FIG. 9A is a diagram showing the placement configuration change from "2×2" to "2×3", and from "2×3" to "2×1" and "2×2" for the partial images that are supposed to be displayed by the projectors 4. FIG. 9B is a diagram for illustrating, at the time of alignment change as shown in FIG. 9A, a method of changing the setting status of the relative position information in the setting input sections 42 of the projectors 4, and a method of changing the connection status in which the projectors 4 are connected in series. Note that, in FIGS. 9A and 9B, for convenience, the image input terminal 431A is not shown.

In the embodiment, the projectors 4 are each configured to include the transmission/reception section 433, the setting input section 42, and the control device 43 including the connection status detection section 434, the transmission control section 435, the processing section 436, and the partial image information generation section 4381A. With such a configuration, at the time of placement of the multi-display system 1, unlike with the previous technologies, a person who is in charge of placement is no more required to establish a cascade connection among a PC and display devices, and to make a setting of processing requirements through a setting screen displayed on a display section of the PC. This means that, without using a PC, the person in charge makes a setting of relative position information to the setting input section 42 of each of the projectors 4, and he or she establishes a cascade connection among the projectors 4 over the signal lines S6 to S8, thereby enabling the projectors 4 to each autonomously recognize the placement configuration and the absolute position needed for generation of the partial image information. As such, there is no more need for any complicated operation setting so that the multi-display system can be constructed with ease.

The person in charge of placement is no more required to make settings of processing requirements as such, there is no possibility of erroneous setting as has been common with the previous technologies. If with appropriate setting of the connection status of the signal lines S6 to S8 and the relative position information, and if with appropriate placement of the projectors 4, an original image can be displayed satisfactorily.

Moreover, the projectors 4 each autonomously recognize the placement configuration and the absolute position needed for generation of the partial image information as such. Accordingly, when a person in charge wants to change the placement configuration, without using a PC as with previous technologies, he or she can fulfill his or her purpose only by changing the setting status of the relative position information in the setting input sections 42 for the projectors 4, or only by changing the connection status in which the projectors 4 are connected in sequence.

For example, as shown in FIG. 9A, changing the placement configuration from "2×2" to "2×3" is as below.

That is, as shown in FIG. 9B, for the projectors 4 for use, two more projectors 4E and 4F are additionally provided. Note that the projectors 4E and 4F are configured the same as the projectors 4A to 4D described above. As shown in FIG. 9B, a signal line S9 establishes a connection between the second signal, input/output terminal 431C of the projector 4D and the first signal input/output terminal 431B of the projector 4E, and a signal line S10 establishes a connection between the second signal input/output terminal 431C of the projector 4E and the first signal input/output terminal 431B of the projector 4'. In the projector 4D, the setting input section 42 is moved to slide, and the switch top 42A is placed at the position of "right" formed to the external cabinet 44. In the projector 4E, the setting input section 42 is moved to slide, and the switch top 42A is placed at the position of "above" formed to the external cabinet 44. In the projector 4F, the setting input section 42 is moved to slide, and the switch top 42A is placed at the position of "•" formed to the external cabinet 44.

Only with the operation as such, the display change can be made with ease from the tiring display of length 2× width 2 to the tiling display of length 2× width 3.

As another example, as shown in FIG. 9A, changing the placement configuration from "2×3" to "2×1" and "2×2" is as below.

That is, as shown in FIG. 9B, the signal line S7 connecting the projectors 4B and 4C is removed. In the projector 4B, the setting input section 42 is moved to slide, and the switch top 42A is placed at the position of "•" formed to the external cabinet 44.

Only with the operation as such, the display change can be made with ease from the tiling display of length 2× width 3 to the tiling display of length 2× width 1, and to the tiling display of length 2× width 2.

Herein, because the setting input section 42 for setting of the relative position information is configured by a mechanical switch section, a person in charge of placement can make a setting of relative position information to the setting input sections 42 without turning on the projectors 4. What is better, because the person in charge can visually check the setting status of the relative position information by the setting input sections 42, he or she can dispose the protectors 4 at their predetermined positions while visually checking the relative position information.

In a case where an original image is configured by partial images with no overlapping thereamong, if the projectors are not appropriately disposed, a clearance is resultantly observed among the partial images, and the original image cannot be satisfactorily displayed.

In this embodiment, partial images are at least partially overlapped one another, and configure an original image with such overlapped portions. The partial image information generation section 4381A generates partial image data by cutting out, from original image data, image information of a range including such overlapped portions of the partial images using a parameter of processing requirements in which a cut-out range including the overlapped portions of the partial images. As such, the partial images extended and projected from each of the projectors 4 are at least partially overlapped so that an original image is displayed. This thus favorably prevents clearance formation among the partial images, thereby enabling to display an original image with a satisfactory level.

The projectors 4 are each provided with the reference image information storage section 4372 and the reference image display control section 4382. This accordingly enables, with no connection with a PC, display of a reference partial image corresponding to the position of a partial image that is supposed to be displayed by the display device of its own. Accordingly, at the time or placement of the multi-display system 1, a person in charge can appropriately adjust the positions of the projectors 4 while looking at the reference partial image being the results of the extended projection by each of the projector 4. That is, the multi-display system 1 can be constructed with more ease.

Herein, the reference image display control section 4382 exercises reference image display control when the projectors 4 are each turned on. Accordingly, at the time of placement of the multi-display system 1 only by a person in charge turning on the projectors 4, the projectors 4 each accordingly extend and project the reference partial image corresponding to the partial image that is supposed to be displayed thereby. As such, the person in charge can appropriately adjust the positions of the projectors 4 swiftly while looking at the reference partial images on display. That is, the multi-display system 1 can be constructed with more ease and speed.

The reference partial images each include guidance information, i.e., information about color difference between the grid lines, i.e., F1A, F2A, F3A, and F4A, and the areas, i.e., F1B, F2B, F3B, and F4B. This enables, at the time of placement of the multi-display system 1, a person in charge to appropriately adjust the positions of the projectors 4 with ease and accuracy by checking the guidance information found in each of the reference partial images being the results of the extended projection by the projectors 4.

Second Embodiment

Described next is a second embodiment of the invention by referring to the accompanying drawings.

In the description below, any configuration or component similar to that in the first embodiment is provided with the same reference numeral, and not described in detail again.

Figure 10:
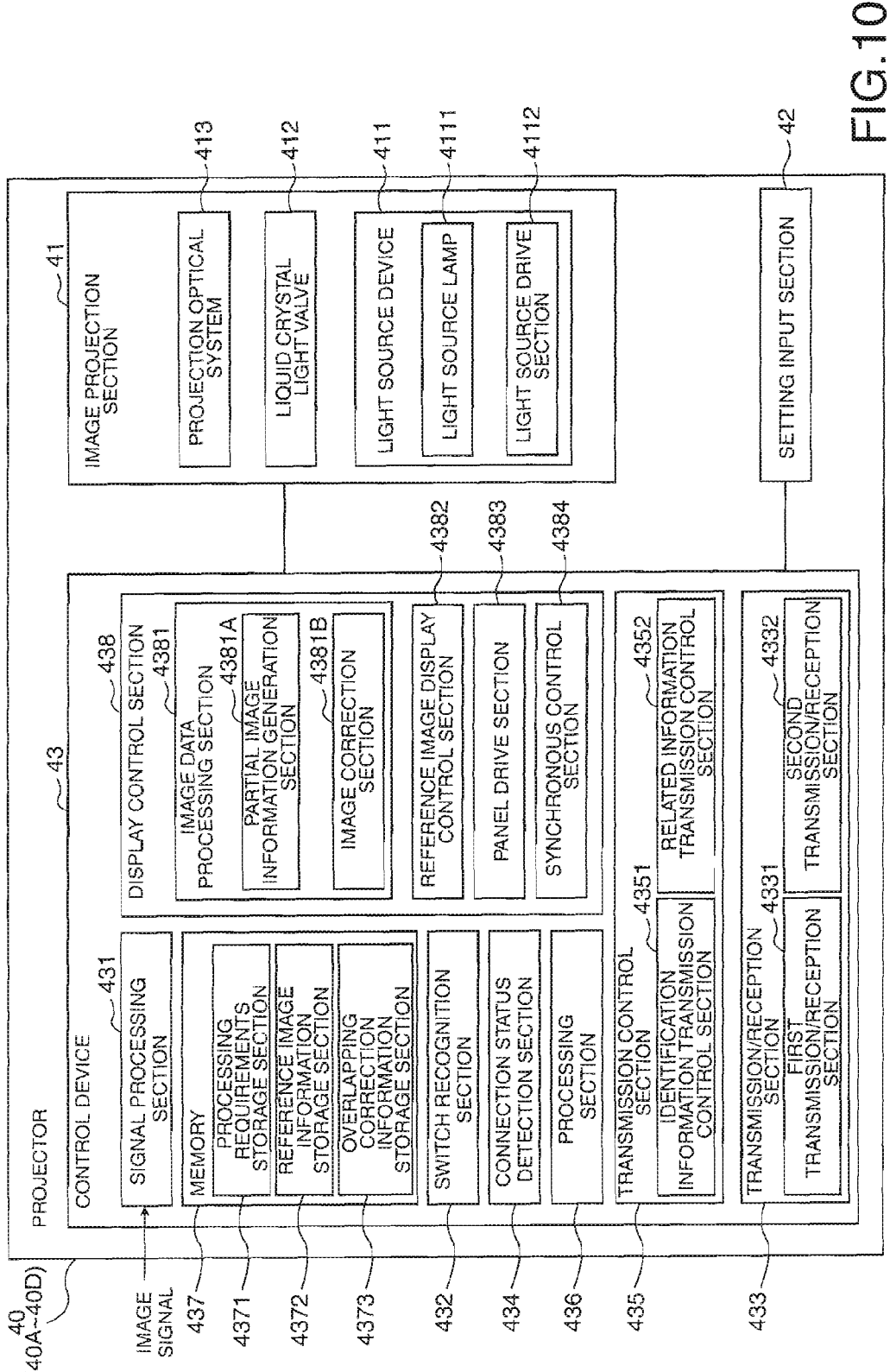
FIG. 10 is a block diagram showing the configuration of a projector of a second embodiment of the invention.

FIG. 10 is a block diagram showing the configuration of a projector 40 in the second embodiment.

The only difference of the second embodiment from the first embodiment is that the projector 40 applies an edge blending process to image data for brightness adjustment. In the second embodiment, four of the projectors 40, i.e., projectors 40A, 40B, 40C, and 40D, are provided similarly to the first embodiment, and the image data for edge blending process is the one corresponding to overlapped portions, i.e., portions where partial images are overlapped, in partial image data. That is, the difference lays in the function of the image data processing section 4381, i.e., image correction section 4381B, of the control device 43 configuring the projector 40, and the information stored in the memory 437. The remaining configuration is the same as that of the first embodiment.

The memory 437 is a portion of storing a control program for execution of various types of processing in the control device 43, information needed for various types of processing, information being the processing results, or others. The memory 437 is provided with an overlapping correction information storage section 4373 in addition to the processing requirements storage section 4371 and the reference image information storage section 4372, which are described in the first embodiment.

The overlapping correction information storage section 4373 stores therein a parameter of overlapping correction needed for the edge blending process for execution by the image correction section 4381B. This parameter of overlapping correction is information about overlapped portion information indicating the range of an overlapped portion, and about a parameter of brightness adjustment for brightness adjustment of the image data of the overlapped portion based on the overlapped portion information. The overlapping correction information storage section 4373 correlates the parameters of overlapping correction with placement configurations and absolute positions possible in the multi-display system, e.g., in the placement configuration of "1×1", the area set to the "1st position" is correlated with a predetermined parameter of overlapping correction, in the placement configuration of "1×2", the area set to the "1st position" is correlated to a predetermined parameter of overlapping correction, in the placement configuration of "1×2", the area set to the "2nd position" is correlated to a predetermined parameter of overlapping correction, and the like. For example, the overlapping correction information storage section 4373 includes a data table for use to segment a plurality of information, and for every placement configuration and for every absolute position, the parameter of overlapping correction is stored in accordance with the segments of the data table.

The image correction section 4381B serving as the brightness adjustment section has the following functions in addition to the function of applying, as required, any needed image data correction process, e.g., gamma correction, to the partial image data described in the first embodiment. That is, the image correction section 4381B reads the parameter of overlapping correction from the overlapping correction information storage section 4373. The parameter of overlapping correction is the one correlated to the placement configuration and the absolute position recognized in the processing section 436. Using the parameter of overlapping correction read as such, the image correction section 4381B applies an edge blending process to the image data corresponding to any predetermined overlapped portion in the partial image data for brightness adjustment, e.g., intensity and color.

Figure 11:
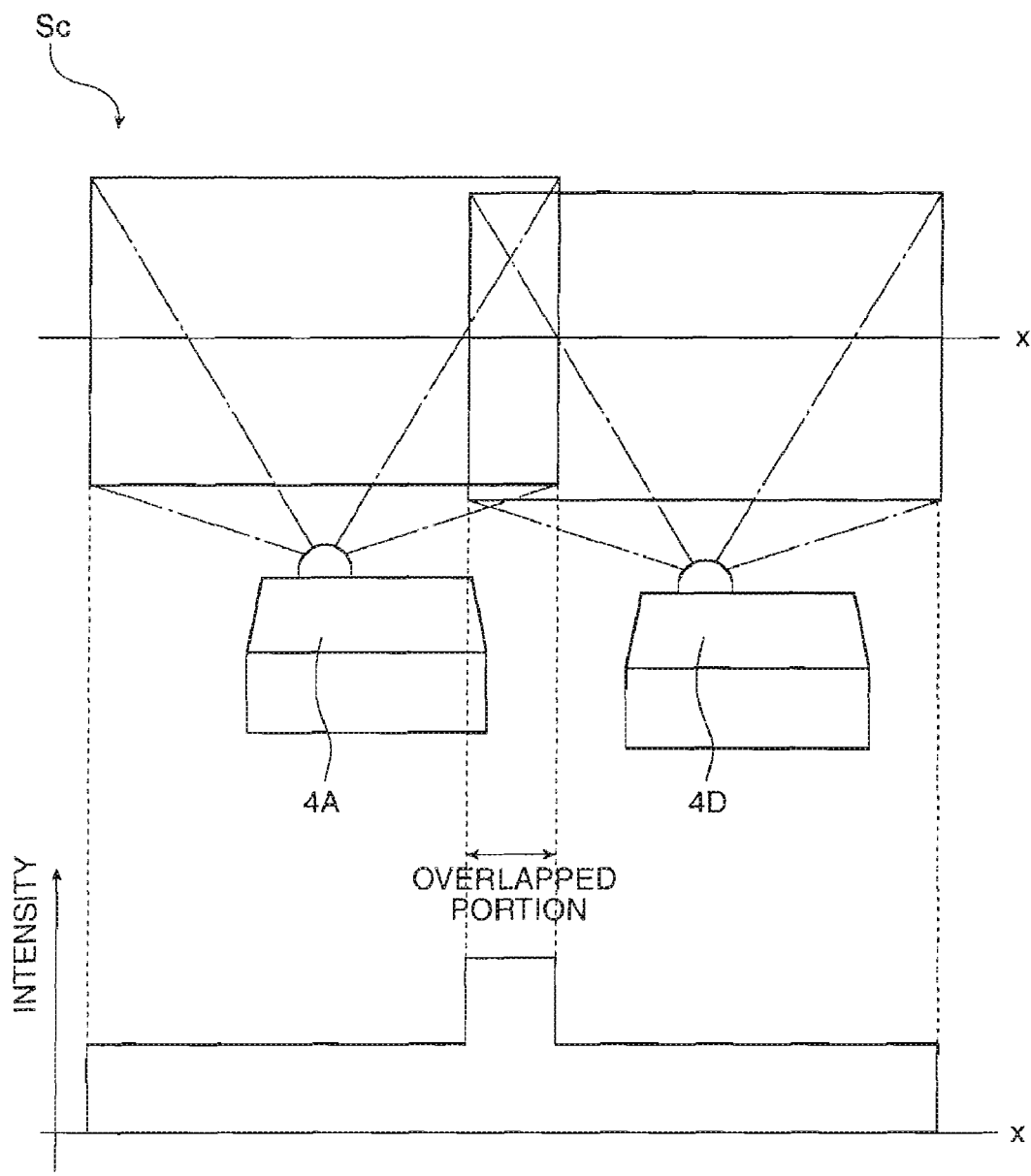
FIG. 11 is a diagram for illustrating an edge blending process by an image correction section of the second embodiment.
Figure 12:
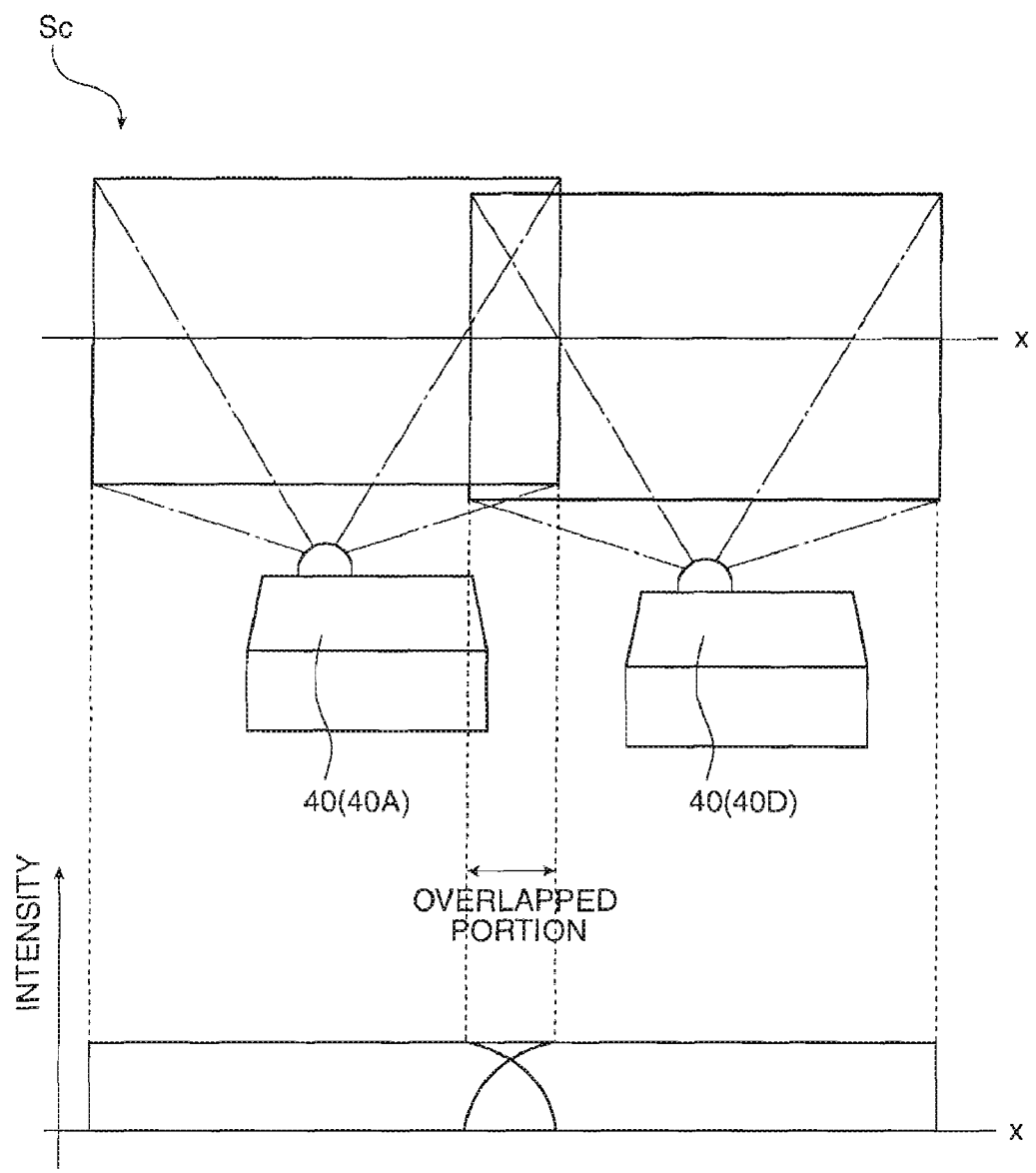
FIG. 12 is another diagram for illustrating edge blending process by the image correction section of the second embodiment.

FIGS. 11 and 12 are each a diagram for illustrating the edge blending process by the image correction section 4381B.

As in the first embodiment, when no edge blending process is applied to the partial image data, for example, as shown in FIG. 11, because the projectors 4A and 4D each display the partial image with partial overlapping, the overlapped portions of their display images on the screen Sc have an intensity value higher than the remaining area.

In consideration thereof, in the embodiment, as will be described below, the image correction section described in the first embodiment in addition to the image data correction process of the first embodiment.

That is, the image correction section 4381B reads the parameter of overlapping correction from the overlapping correction information storage section 4373. The parameter of overlapping correction is the one correlated to the placement configuration and the absolute position recognized in the processing section 436. Based on the parameter of overlapping correction read as such, the image correction section 4381B recognizes, by the overlapped portion information, an overlapped portion in the partial image data, and as shown in FIG. 12, applies an edge blending process of gradually reducing the brightness toward the end portion side. This edge blending process is applied to the image data corresponding to the overlapped portion in the partial image data using the parameter of brightness correction.

According to the second embodiment as such, the following effects and advantages can be achieved in addition to those achieved in the first embodiment.

The image correction section 4381B adjusts the brightness of image data corresponding to an overlapped portion by executing an edge blending process. Accordingly, in an original image, the intensity value in the overlapped portion can be of the same level as the remaining area so that the original image looks natural, and can be displayed satisfactorily.

Moreover, an image correction process is executed to adjust the brightness, i.e., intensity and color, of the image data corresponding to the overlapped portion. Accordingly, the projectors 40 can be simplified in configuration compared with the configuration of optically adjusting the brightness of the overlapped portion of the partial image, i.e., configuration of using a light shield for partially adjusting the light amount of the partial image to be extended and projected.

Third Embodiment

Described next is a third embodiment of the invention by referring to the accompanying drawings.

In the description below, any configuration or component similar to that in the first embodiment is provided with the same reference numeral, and not described in detail again.

Figure 13:
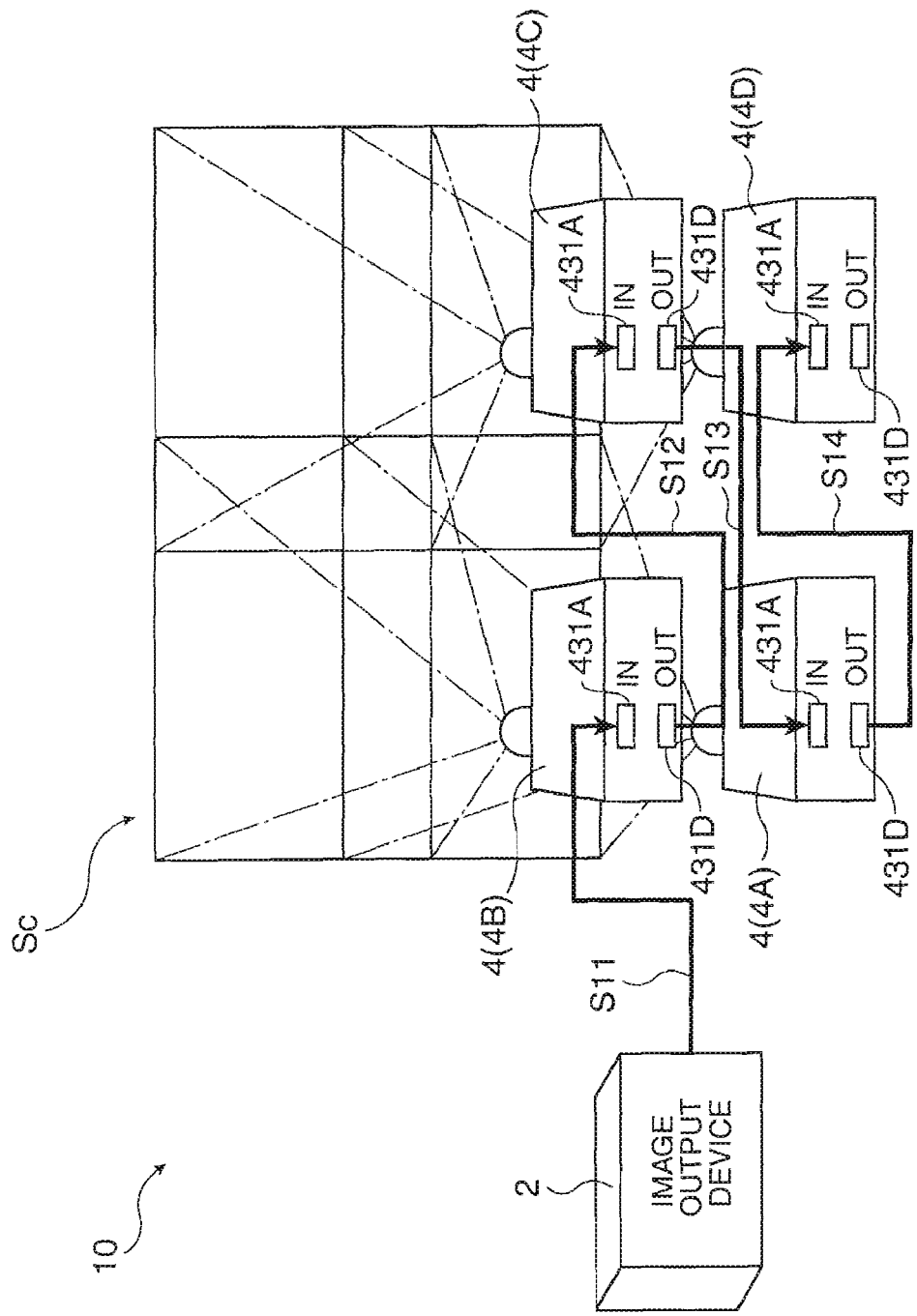
FIG. 13 is a diagram showing the configuration of a multi-display system of a third embodiment of the invention.
Figure 14:
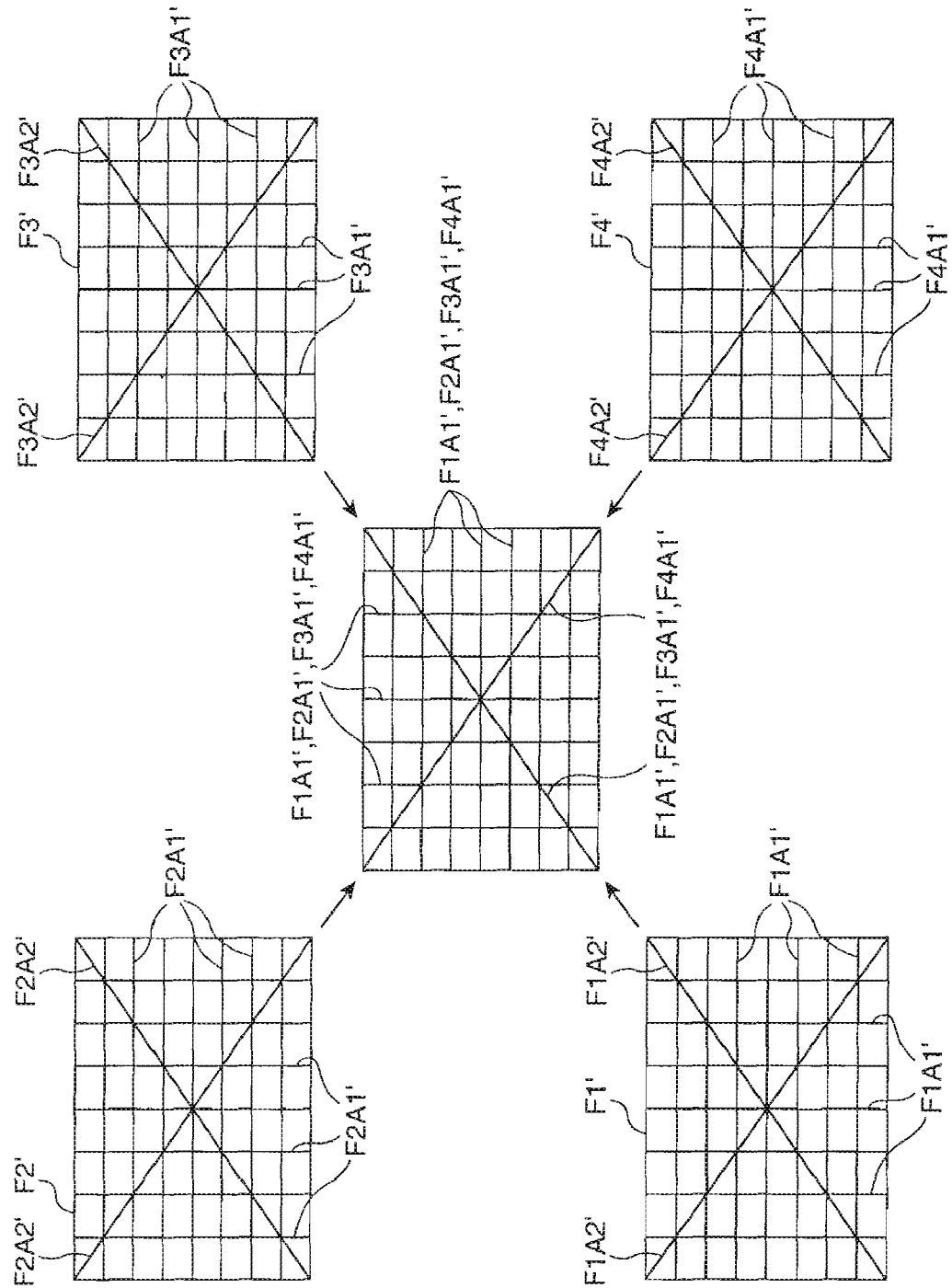
FIG. 14 is a diagram showing an exemplary reference partial image with stack display in the first to third embodiments.

FIG. 13 is a block diagram showing the configuration of a multi-display system 10 in the third embodiment. In FIG. 13, for convenience, some of the components are not shown i.e., the signal lines S6 to S8, the signal input/output terminals 431B and 431C of each of the projectors 4, and the setting input sections 42.

In the first embodiment, the multi-display system 1 uses the image signal splitter 3 to distribute an image signal from the image output device 2 to the projectors 4A to 4D.

In the third embodiment, on the other hand, as shown in FIG. 13, in the multi-display system 10, the projectors 4A to 4D are connected in series, i.e., cascaded, using signal lines S12 to S14, and an image signal is transmitted to the projectors 4A to 4D over the signal lines S12 to S14. Also in the third embodiments as shown in FIG. 13, the multi-display system 10 is not provided with the image signal splitter 3. That is, the only difference from the first embodiment lays in the configuration in which the projectors 4A to 4D are connected in series using the signal lines S1 to S14, and no image signal splitter 3 is provided. The remaining configuration is the same as that of the first embodiment.

That is, as shown in FIG. 13, the projectors 4A to 4D are each provided with an image output terminal 431D such as monitor output terminal, thereby enabling to output, to the outside, an mage signal received via the image input terminal 431A as it is. The image output terminal 431D may be connected to the image input terminal 431A in series as it is. With this being the configuration, the image signal may be led around for a long distance, and thus the signal is attenuated. This resultantly eases mixture of noise, and when the image signal of the image output device 2 has a high output impedance, the image signal is also attenuated. Therefore, although not shown in detail, the preferable configuration is of, with a connection to the signal processing section 431, outputting an image signal to the outside from a signal output section including a buffer amplifier via the image output terminal 431D, for example. With such a configuration, the image signal coming from the signal processing section 431 is output to the outside from the image output terminal 431D via the buffer amplifier so that the image signal is not attenuated that much.

As shown in FIG. 13, in the multi-display system 10, a signal line S11 establishes a connection between the image output device 2 and the image input terminal 431A of the projector 4B, and the signal line S12 establishes a connection between the image output terminal 431D of the projector 4B and the image input terminal 431A of the projector 4C. Also, the signal line S13 establishes a connection between the image output terminal 431D of the projector 4C and the image input terminal 431A of the projector 4A, and the signal line S14 establishes a connection between image output terminal 431D of the projector 4A and the image input terminal 431A of the projector 4D. Through such connections the projectors 4A to 4D are connected in series. As such, with the projectors 4A to 4D connected in series as such, the same image signal is provided to the projectors 4A to 4D from the image output device 2.

Note here that ten multi-display system 10 operates similarly to the multi-display system 1 of the first embodiment, and thus is not described again.

According to the third embodiment as such, the following effects and advantages can be achieved in addition to those achieved in the first embodiment.

In this embodiment, as described in the first embodiment, based on the connection status by the signal lines S6 to S8, and the relative position information set and input to the setting input sections 49, the projectors 4 autonomously recognize the placement configuration and the absolute position needed for generation of partial image data. Accordingly, at the time of establishing a cascade connection among the protectors 4A to 4D using the signal lines S12 to S14, even if the connection of the signal lines S12 to S14 is erroneously established, as long as the connection status of the signal lines S6 to S8 and the relative position information are all accordingly set, and as long as the projectors 4A to 4D are appropriately disposed, the partial images to be extended and projected by the projectors 4A to 4D remain at their predetermined positions so that an original image can be displayed satisfactorily.

Moreover, in the third embodiment, compared with the first embodiment there is no need to include the image signal splitter 3, and the number of required signal lines can be reduced, i.e., four signal lines of S1 to S14 in the third embodiment compared with five signal lines of S1 to S5 in the first embodiment. As such, the multi-display system 10 can be simplified in configuration.

Note here that the invention is not surely restrictive to the embodiments described above, and any possible modifications and variations in the scope of implementing the invention are all included in the invention.

In the embodiments above, the relative position information to be set to the setting input section 42 is about the relative position of the projector 4 connected in series on the rear side of the projector 4 of its own, but this is surely not restrictive.

As an example, the relative position information may be about the relative position of the projector 4 connected in series on the front side of the projector 4 of its own. With this being the configuration, in the above embodiments in the projector 4A, the switch top 42A is positioned at "•", and in the projector 4B, the switch top 42A is positioned at "below". In the projector 4C, the switch top 42A is positioned at "left", and in the projector 4D, the switch top 42A is positioned at "above".

As another example, the relative position information may be about the relative position of the projector 4 of its own with respect to any other projector 4 connected in series on the rear side. With this being the configuration, in the above embodiments, in the projector 4A, the switch top 42A is positioned at "below", and in the projector 4B, the switch top 42A is positioned at "left". In the projector 4C, the switch top 42A is positioned at "above", and in the projector 4D, the switch top 42A is positioned at "•".

As still another example, the relative position information may be about the relative position of the projector 4 of its own with respect to any other projector 4 connected in series on the front side. With this being the configuration, in the above embodiments, in the projector 4A, the switch top 42A is positioned at "•", and in the projector 4B, the switch top 42A is positioned at "above". In the projector 4C, the switch top 42A is positioned at "right", and in the projector 4D, the switch top 42A is positioned at "below".

As described above, in the aspects of the invention, the relative position information includes four types. The process of recognizing the placement configuration and the absolute position by the processing section 436 may be executed in accordance with the relative position information.

In the above embodiments, the setting input section 42 is configured by a slide switch, but this is surely not restrictive, and may be configured by any other mechanical switch such as dip switch, or may be a setting input section of other types not being a mechanical switch.

In the above embodiments, the processing section 436 recognizes the connection sequence indicating the position of the projector 4 of its own among the other projectors 4 from the forefront (step ST4). Alternatively, the processing section 436 may recognize the connection sequence indicating the position of the projector 4 of its own among the other projectors 4 from the tail. When recognizing the connection sequence as such, the processing section 436 recognizes also the number of cascaded projectors 4. Alternatively, without recognizing the number of projectors 4 as such, the processing section 436 may recognize the connection sequence indicating the position of the projector 4 of its own among the other projectors 4 from the forefront or the tail. With this being the configuration, the identification information transmission control section 4351 may be so configured as to transmit only either the front or rear identification information. That is, in the process follow of FIG. 3, either step ST2 or ST3 may be skipped.

In the above embodiments, the partial image information generation section 4381A generates partial image data using a parameter of processing requirements correlated to the placement configuration and the absolute position recognized by the processing section 436 specifically from those others stored in the processing requirements storage section 4371, but this is surely not the only option. The process by the partial image information generation section 4381A of generating the partial image data is not restrictive as long as it is of generating the partial image data by cutting out at east a part of original image data based on the placement configuration and the absolute position recognized by the processing section 436.

In the above embodiments, described is the case that an original image is configured with overlapped portions where the partial images are partially overlapped. This is surely not restrictive, and an original image may be configured by the partial images with no overlap among the partial images.

In the above embodiments, alternatively, if with erroneous connection status among the projectors 4 by the signal lines S6 to S8, or if with any erroneous setting of the relative position information to the setting input sections 42, when the switch top 42A of the setting input section 42 of the projector 4A is located at "•", the control device 43 may exercise drive control over the image projection section 411, and make it display an error message telling "erroneous setting of setting input section 42", for example. As an example, because the processing section 436 does not recognize the placement configuration in the above-described setting status, the error display may be made with a trigger of not being able to recognize the placement configuration.

In the above embodiments, the reference image display control section 4382 reads reference partial image data from the reference image information storage section 4372, and exercises reference image display control of displaying a reference partial image based on the reference partial image data. The reference partial image data is the one correlated to the placement configuration and the absolute position recognized by the processing section 436. This is surely not restrictive, and the reference image display control may be exercised as below.

For example, reference original image data of a screen is stored in the reference image information storage section. Similarly to the partial image data generation process of the partial image information generation section 4381A, the reference image display control section generates reference partial image data by cutting out, from the reference original image data, image data of a cut-out range corresponding to the position of a partial image that is supposed to be displayed by the projector 4 of its own. Thereafter, the reference image control section exercises reference image display control to implement the display of a reference partial image based on the generated reference partial image data.

In the above embodiments, the reference partial images F1 to F4 being the results of extended projection by the projectors 4 are all the same image, but this is surely not restrictive.

With the reference partial image F1, for example, in the areas F1B, the areas F1B3, F1B7, and F1B8 are set to white in color. With the reference partial image F2, for example, in the areas F2B, the areas F2B1, F2B5, and F2B8 are set to white in color. With the reference partial image F3, for example, in the areas F3B, the areas F3B2, F3B5, and F3B5 are set to white in color. With the reference partial image F4, for example, in the areas F4B, the areas F4B4, F4B6, and F4B7 are set to white in color. That is, this is aimed to clearly distinguish the areas where the adjacent reference partial images are overlapped from the areas where no adjacent reference partial images are overlapped.

Moreover, in the above embodiments, the guidance information is about color difference between the grid lines, i.e., F1A, F2A, F3A, and F4A, and the areas, i.e., F1B, FP2B, F3B, and F4B, but this is surely not the only option.

The guidance information may be number, character, or others. For example, the reference partial image F1 may include a number of "1" or a character of "A", the reference partial image F2 may include a number of "2" or a character of "B", the reference partial image F3 may include a number of "3" or a character of "C", and the reference partial image P4 may include a number of "4" or a character of "P".

Alternatively, the reference partial image may not necessarily include such guidance information.

In the above embodiments, described is "tiling display" with which an original image is configured by partial images. The projectors 4 in the above embodiments are assumed as being configured to be ready for "stack display" with which partial images are overlaid one on the other so that an original image is configured. That is, for this "stack display", in all of the projectors 4, for example, the switch tops 42A of their setting input sections 42 are all positioned at "•" formed to the external cabinet 44, and the signal lines S6 to S8 connecting the projectors 4 are removed. With such connection status and the setting status, in all of the projectors 4, the processing sections 436 recognize, in the placement configuration of "1×1", the area set to the "1st position" as the placement configuration and the absolute position. The partial image information generation section 4381A then reads from the processing requirements storage section 4371, the parameter of processing requirements correlated to the placement configuration and the absolute position recognized by the processing section 436, i.e., the area set to the "1st position" in the placement configuration of "1×1". Using the parameter of processing requirements read as such, the partial image information generation section 4381A applies, to the original image data, an image data cut-out process (cutting out every area of the original image data), and an image size change process (scale ratio of 1), i.e., changes the original image data to the partial image data.

For "stack display" as above, the reference image display control section 4382 exercises reference image display control of displaying the following reference partial images F1', F2', F3', and F4'.

FIG. 13 is a diagram showing exemplary reference partial, images F1', F2', F3', and F4 for stack display. Note here that the image at the center of FIG. 13 indicates a reference original image with stack display, i.e., the reference partial images F1', F2', F3', and F4' are overlaid one on the other.

That is, the reference image display control section 4382 reads, from the reference image information storage section 4372, the reference partial image data correlated to the placement configuration and the absolute position recognized by the processing section 436, i.e., the area set to the "1st position" in the placement configuration of "1×1". Based on the reference partial image data read as such, the reference image display control section 4332 exercises the reference image display control of forming a reference partial image to the liquid crystal light valves 412.

As shown in FIG. 13, the reference partial images F1' to F4' each include the guidance information for use to adjust the placement positions of the projectors 4. More specifically, as shown in FIG. 13, the reference partial images F1' to F4' include, respectively, grid lines F1A1', F2A1', F3A1', and F4A1' extending vertically and laterally, and a pair of diagonal lines F1A2', F2A2', F3A2', and F4A2'. In FIG. 13 example, the lines F1A1', F2A1', F3A1', and F4A1' each exist seven in the vertical direction, and seven in the lateral direction. At the time of placement of the multi-display system 1, a person in charge of placement disposes the projectors 4A to 4D while checking the reference partial images F1' to F4', i.e., to derive matching among the lines F1A1' to F4A1', and matching among the diagonal lines F1A2' to F4A2'.

In the second embodiment, the brightness adjustment section is the image correction section 4381B. This is surely not restrictive, and a light shield may be used for optically adjusting the brightness of the overlapped portions of the partial images, i.e., partially adjusting the light amount of the partial images to be extended and projected.

Also in the second embodiment, to the image data corresponding to an overlapped portion in the partial image data, the image correction section 4381B executes an edge blending process of gradually reducing the brightness toward the end portion side. This is surely not restrictive, and alternatively, the image correction section 4381B may execute a process of reducing the intensity value of image data corresponding to the overlapped portion down to substantially 0, a process of changing the color of image data corresponding to the overlapped portion to black, or others.

The configuration of the third embodiment, i.e., the projectors 4 are cascaded by the signal lines S12 to S14, may be provided with a function of executing the edge blending process of the second embodiment.

In the above embodiments, the signal lines S1 to S14 are described as transmitting signals over an USB (Universal Serial Bus) cable, LAN (Local Area Network), or others. Alternatively, the signals may be transmitted via any radio medium, i.e., radio, audio, and infrared.

In the embodiments, a liquid crystal panel of a translucent type, i.e., the liquid crystal light valve 412, is used. This is surely not the only option, and another possible option is a liquid crystal panel of a reflective type or a Digital Micromirror Device (trademark of Texas Instruments).

In the above embodiments, the number of the liquid crystal light valves 412 is three. This is surely not the only option, and an alternative possible configuration may include only one, two, or four or more of the liquid crystal light valve 412.

In the above embodiments, the display device is exemplified by a projector. This is surely not restrictive, and the display device may be a direct-view-type display, e.g., plasma display, liquid crystal display, and CRT (Cathode-Ray Tube) display. When such a direct-view display is used as a display device, unlike the overlapped portions described in the above, edge portions are observed in the displays. Therefore, it is preferable to make not conspicuous the edge portions through brightness adjustment as is performed in the image correction process described in the second embodiment.

While the best configuration or others for implementing the invention have been described in the above, the foregoing description is in all aspects illustrative and not restrictive. That is, the invention is made apparent mainly for a specific embodiment when taken in conjunction with the accompanying drawings, but it is understood that numerous other modifications and variations can be devised by those skilled in the art in terms of shape, material, volume, and any other details without departing from the scope of the invention.

As such, the descriptions of the embodiment with the limited shape, material, or others, is no more than an example provided for the aim of facilitating the understanding of the invention, and the invention is not surely restrictive thereto. The descriptions, by name, of components without, partially or entirely, such restrictions in terms of shape, material, or others are included in the invention.

The entire disclosure of Japanese Patent Application No. 2006-215389, filed Aug. 8, 2006 is expressly incorporated by reference herein.

What is claimed is:

1. A display device, comprising:
 a transmission/reception section that is connected to an other display device, and transmits and receives information to/from the other display device connected thereto;
 a setting input section that enables setting and input of relative position information about a relative position between a partial image displayed by the display device and the partial image displayed by the other display device connected thereto; and
 a first control device that generates partial image information from original image information, and makes a display section to display thereon a partial image based on the partial image information, wherein
 the other display device includes a second control device separate from the first control device;
 each of the first and second control devices includes:
  a related information transmission control section that transmits, via the transmission/reception section, position-sequence-related information related to the relative position information set and input to the setting input section;
  a configuration position recognition section that recognizes, based on the position-sequence-related information of the display device, and based on any received position-sequence-related information of the other display device, an absolute position of the partial image in the original image that is supposed to be displayed by the display device; and
  a partial image information generation section that generates, based on the absolute position recognized by the configuration position recognition section, the partial image information by cutting out at least a part of image information from the original image information; and
 the first control device further includes:
  a connection status detection section that detects a connection status of the transmission/reception section;
  an identification information transmission control section that transmits, via the transmission/reception section, identification information assigned to the display device in accordance with the connection status detected by the connection status detection section; and
  a connection sequence recognition section that recognizes a connection sequence of the display device with the other display device based on at least either the connection status detected by the connection status detection section or the received identification information,
 the position-sequence-related information provided by the related information transmission control section is also related to connection sequence information about the connection sequence recognized by the connection sequence recognition section.

2. The display device according to claim 1, wherein
the transmission/reception section includes first and second transmission/reception sections,
the connection status detection section that detects a connection status of the first transmission/reception section and a connection status of the second transmission/reception section;
the identification information transmission control section that transmits, via either the first or second transmission/reception section, identification information assigned to the display device in accordance with the connection status detected by the connection status detection section;
the position-sequence-related information for transmission by the related information transmission control section is related to, via at least either the first or second transmission/reception section, the relative position information set and input by the setting input section and connection sequence information about the connection sequence recognized by the connection sequence recognition section, and
the configuration position recognition section recognizes, based on the position-sequence-related information of the display device, and based on the position-sequence-related information of the other display device, the absolute position of the partial image that is supposed to be displayed by the display device.

3. The display device according to claim 1, wherein
the partial images are partially overlapped each other, and configure the original image with an overlapped portion, and
the partial image information generation section generates the partial image information by cutting out, from the original image information, the image information of an area including the overlapped portion of the partial images.

4. The display device according to claim 3, further comprising a brightness adjustment section that adjusts brightness of the overlapped portion of the partial images.

5. The display device according to claim 1, wherein
the first control device includes
a reference image display control section that exercises reference image display control over the display section to display a reference partial image being at least a part of a screen based on the absolute position recognized by the configuration position recognition section.

6. The display device according to claim 5, wherein
the reference image display control section exercises the reference image display control when the display device is turned on.

7. The display device according to claim 5, wherein
the reference partial image is configured with guidance information for use to adjust a placement position of the display device.

8. A multi-display system, wherein
the multi-display system includes a plurality of display devices that are each the display device of claim 1.

9. An image information generation method for a display device, wherein
the display device includes:
a transmission/reception section that is connected to an other display device, and transmits and receives information to/from the other display device connected thereto;
a setting input section that enables setting and input of relative position information about a relative position between the display device and the other display section connected thereto; and
a first control device that generates partial image information from original information, and makes a display section to display thereon a partial image based on the partial image information, the other display device having a second control device separate from the first control device, and
the image information generation method comprises:
transmitting, by the first control device, via the transmission/reception section, position-sequence-related information related to the relative position information set and input to the setting input section;
recognizing, by the first control device, based on the position-sequence-related information of the display device, and based on any received position-sequence-related information of the other display device, an absolute position of the partial image in the original image that is supposed to be displayed by the display device;
transmitting, by the first control device, based on the absolute position recognized by recognizing the configuration position, the partial image information by cutting out at least a part of image information from the original image information;
detecting, by the first control device, a connection status of the transmission/reception section;
transmitting, by the first control device, via the transmission/reception section, identification information assigned to the display device in accordance with the connection status detected by the connection status detection section;
recognizing, by the first control device, a connection sequence of the display device with the other display device based on at least either the connection status detected by the connection status detection section or the received identification information; and
providing, by the first control device, the position-sequence-related information related to connection sequence information about the connection sequence recognized by the connection sequence recognition section.

10. The display device according to claim 1,
wherein the setting input section is moved to indicate a position of a first projector relative to a position of second projector.

11. The display device according to claim 1,
wherein the partial image information generation section is configured to read start point coordinates and calculates end point coordinates based on the start point coordinates in order to obtain the absolute position.

12. The display device according to claim 9,
wherein the setting input section is moved to indicate a position of a first projector relative to a position of a second projector.

13. The display device according to claim 9,
wherein the generating the partial image information includes reading start point coordinates and calculating end point coordinates based on the start point coordinates in order to obtain the absolute position.

14. The display device according to claim 10,
wherein the setting input section includes a switch that is moved to an above, below, left, right or end position to indicate the position of the first projector relative to the position of the second projector.

* * * * *